(12) United States Patent
Ishii et al.

(10) Patent No.: US 8,982,216 B2
(45) Date of Patent: Mar. 17, 2015

(54) PORTABLE MOVEMENT CAPTURE DEVICE AND METHOD OF FINITE ELEMENT ANALYSIS

(75) Inventors: Hideyuki Ishii, Portland, OR (US);
Nicholas A. Leech, Aloha, OR (US);
Yutaka Kabeshita, Portland, OR (US);
Arthur Molinari, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 488 days.

(21) Appl. No.: 13/289,715

(22) Filed: Nov. 4, 2011

(65) Prior Publication Data

US 2013/0113961 A1    May 9, 2013

(51) Int. Cl.
*H04N 5/225*    (2006.01)
*H04N 5/262*    (2006.01)

(52) U.S. Cl.
CPC ........ *H04N 5/262* (2013.01); *A63B 2243/0029* (2013.01)
USPC ............................. 348/157; 473/131; 434/252

(58) Field of Classification Search
CPC ........................ A63B 24/0003; A63B 24/0006
USPC .................................... 473/218–277; 434/252
See application file for complete search history.

(56) References Cited

U.S. PATENT DOCUMENTS

| | | | |
|---|---|---|---|
| 4,063,259 A | 12/1977 | Lynch et al. | |
| 4,136,387 A | 1/1979 | Sullivan et al. | |
| 4,375,887 A | 3/1983 | Lynch et al. | |
| 5,486,002 A | 1/1996 | Witler et al. | |
| 6,086,487 A | 7/2000 | Morgan et al. | |
| 6,192,323 B1 | 2/2001 | Boehm | |
| 6,241,622 B1 | 6/2001 | Gobish et al. | |
| 6,385,559 B2 | 5/2002 | Boehm | |
| 6,431,990 B1 | 8/2002 | Manwaring | |
| 6,490,542 B2 | 12/2002 | Boehm | |
| 6,514,081 B1 * | 2/2003 | Mengoli | 434/252 |

(Continued)

FOREIGN PATENT DOCUMENTS

| | | |
|---|---|---|
| KR | 10-0130552 | 4/1998 |
| KR | 10-20020023719 | 3/2002 |

(Continued)

OTHER PUBLICATIONS

International Search Report and Written Opinion in PCT Application No. PCT/US2012/062934, mailed on Jan. 7, 2013.

*Primary Examiner* — Twyler Haskins
*Assistant Examiner* — Dwight C Tejano
(74) *Attorney, Agent, or Firm* — Quinn Law Group, PLLC.

(57) ABSTRACT

A portable movement capture device is described. The portable movement capture device includes one or more cameras that capture high-speed video or still images of a player performing a sports activity. In one embodiment, the sports activity is a golf swing of a golfer. The portable movement capture device is arranged in a housing with one or more cameras and may optionally include a number of additional components to assist with capturing information associated with a player performing a sports activity. The captured information is analyzed using a method of finite element analysis to isolate a portion of the captured information. With this arrangement, specific regions of a player are analyzed, individually, or relatively with other regions, for a particular movement associated with the sports activity. A handheld motion capture device is also described that combines components of a portable movement capture device with an integrated display.

9 Claims, 16 Drawing Sheets

(56) References Cited

U.S. PATENT DOCUMENTS

| | | |
|---|---|---|
| 6,561,917 B2 | 5/2003 | Manwaring |
| 6,611,792 B2 | 8/2003 | Boehm |
| 6,658,371 B2 | 12/2003 | Boehm et al. |
| 6,672,978 B1 | 1/2004 | Morgan et al. |
| 6,742,385 B2 | 6/2004 | Katayama |
| 6,758,759 B2 | 7/2004 | Gobush et al. |
| 6,760,685 B2 | 7/2004 | Boehm |
| 7,048,651 B2 | 5/2006 | Kennedy, III et al. |
| 7,143,639 B2 | 12/2006 | Gobush |
| 7,273,427 B2 | 9/2007 | Inoue et al. |
| 7,395,696 B2 | 7/2008 | Bissonnette et al. |
| 7,448,323 B2 | 11/2008 | Kennedy, III et al. |
| 7,503,858 B2 | 3/2009 | Cameron |
| 2002/0114493 A1* | 8/2002 | McNitt et al. ............ 382/107 |
| 2002/0115047 A1* | 8/2002 | McNitt et al. ............ 434/252 |
| 2004/0162154 A1* | 8/2004 | DeJohn ..................... 473/266 |
| 2006/0281060 A1* | 12/2006 | Katayama ................. 434/247 |
| 2007/0244667 A1 | 10/2007 | Ligotti, III et al. |
| 2007/0265105 A1* | 11/2007 | Barton et al. ............. 473/220 |
| 2008/0020867 A1 | 1/2008 | Manwaring |
| 2008/0094472 A1* | 4/2008 | Ayer et al. ................ 348/157 |
| 2008/0182685 A1* | 7/2008 | Marty et al. .............. 473/407 |
| 2008/0287207 A1 | 11/2008 | Manwaring |
| 2009/0042661 A1* | 2/2009 | Cheng ...................... 473/266 |
| 2009/0326688 A1 | 12/2009 | Thomas et al. |
| 2010/0117837 A1* | 5/2010 | Stirling et al. ........... 340/573.1 |
| 2011/0009215 A1 | 1/2011 | Ichikawa et al. |
| 2012/0050529 A1* | 3/2012 | Bentley ..................... 348/139 |

FOREIGN PATENT DOCUMENTS

| | | |
|---|---|---|
| WO | 0021014 | 4/2000 |
| WO | 0059587 | 10/2000 |
| WO | 0071212 | 11/2000 |

* cited by examiner

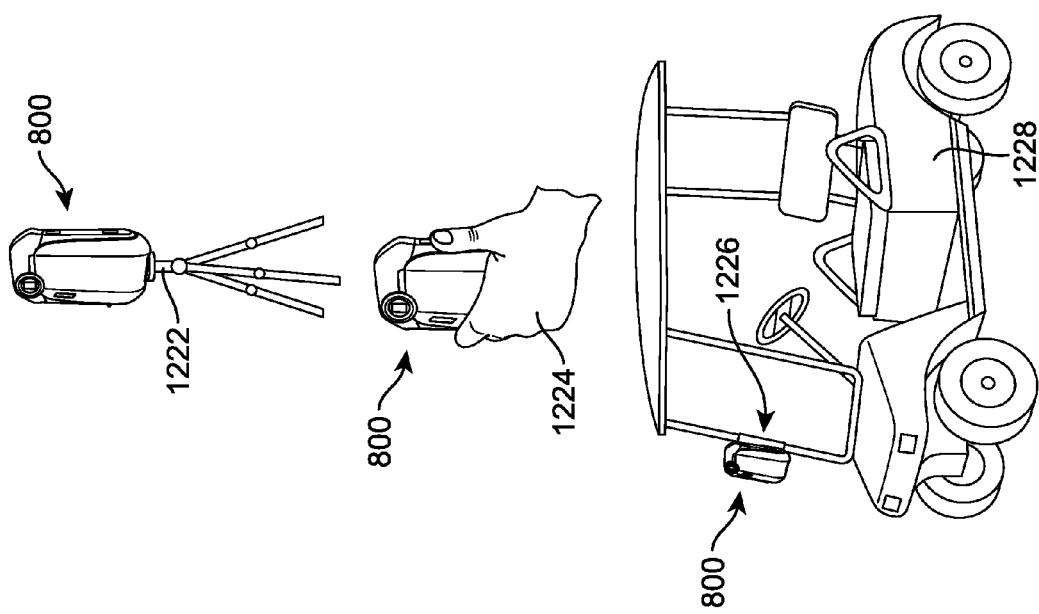
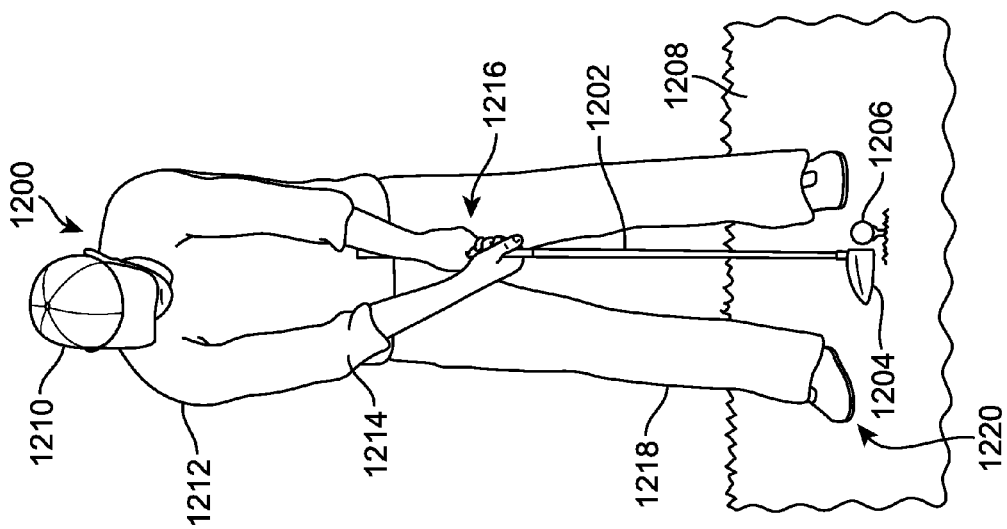
FIG. 12

PORTABLE MOVEMENT CAPTURE DEVICE AND METHOD OF FINITE ELEMENT ANALYSIS

BACKGROUND

The present invention relates generally to a portable movement capture device and a method of finite element analysis. More specifically, the present invention relates to a system and device for capturing and analyzing a golf swing and an associated method of analyzing finite elements of a captured golf swing.

The game of golf requires that the golfer exhibit fine control over the mechanics of his or her swing. Small differences in a golfer's swing can dramatically affect how the golf ball is hit and subsequently plays. Both amateur and professional golfers spend sizeable amounts of time developing the muscle memory and fine motor skills necessary to improve their game.

A variety of devices are known in the art that can measure parameters associated with a golf swing. Such devices can enable a golfer to measure various aspects of his or her swing, so that the golfer may critique and improve these aspects. Such devices generally require that a golfer take swings at a ball while being monitored by launch monitors, video devices and other measuring devices. The measurements generally taken include the club head speed, ball speed, launch angle, attack angle, backspin, sidespin and total distance, among others.

However, such devices suffer from several deficiencies. Foremost among these is cost. Some types of launch monitors generally use radar technology in conjunction with the Doppler effect to measure the speed and position of the golf club and ball. These launch monitors must be capable of emitting the precise type of radar necessary, as well as analyzing the shift in frequency due to the Doppler effect, in order to provide useful information to the golfer. The launch monitors therefore tend to be expensive, and can be especially cost prohibitive for amateur golfers. In addition, launch monitors can require professional calibration and set up to be able to obtain accurate information.

A golfer seeking feedback about his or her swing characteristics may also employ a golf professional to watch the golfer's swing and provide feedback about various positions of the golfer's body before, during, and after hitting the ball. Obtaining this type of feedback, however, can be expensive. In addition, a golfer may not have any recorded information available to him or her from this type of feedback.

Accordingly, there is a need in the art for a system and method that would allow amateur and professional golfers alike to be able to capture and analyze various aspects of their swings in an accurate and cost effective manner.

SUMMARY

In one aspect, the invention provides a portable movement capture device for capturing information associated with a golf swing of a golfer comprising: a housing; a camera; at least one buffer memory in communication with the camera; a light source; a microphone; wherein the camera, the light source, and the microphone are disposed within the housing; wherein the microphone is configured to detect a sound associated with a golf ball being struck by a golf club and transmit a trigger signal; wherein the camera is configured to capture information associated with the golf swing in the buffer memory; and wherein the camera is further configured to save a predetermined amount of the captured information from the buffer memory in response to the trigger signal received from the microphone.

In another aspect, the invention provides a portable movement capture device for capturing information associated with a golf swing of a golfer comprising: a housing; a camera; at least one memory in communication with the camera; a light source; a display; wherein the camera, the light source, and the display are disposed within the housing; wherein the camera is configured to capture information associated with the golf swing and one or more regions of the golfer during the golf swing in the memory; and wherein the display is configured to display captured information associated with at least one isolated region from the one or more regions of the golfer apart from the other captured information in the memory.

In another aspect, the invention provides a portable movement capture device for capturing information associated with a golf swing of a golfer comprising: a housing; a plurality of cameras; at least one buffer memory in communication with the plurality of cameras; a light source; a microphone; wherein at least one of the plurality of cameras, the light source, and the microphone are disposed within the housing; wherein the microphone is configured to detect a sound associated with a golf ball being struck by a golf club and transmit a trigger signal; wherein the plurality of cameras are configured to capture information associated with the golf swing in the buffer memory; and wherein the plurality of cameras are further configured to save a predetermined amount of the captured information from the buffer memory in response to the trigger signal received from the microphone.

In another aspect, the invention provides a method of analyzing captured information associated with a golf swing of a golfer using finite element analysis, the method comprising: capturing information associated with the golf swing of a golfer and one or more regions of the golfer during the golf swing using a camera disposed in a portable movement capture device; storing at least a portion of the captured information in a memory of the portable movement capture device; identifying at least one subset of the captured information in the memory for further analysis; isolating at least one region from the one or more regions of the golfer during the golf swing in the memory; and displaying captured information associated with at least one isolated region from the one or more regions of the golfer apart from the other captured information in the memory.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 12 is a schematic view of alternate processes of capturing a golf swing using a portable movement capture device;

DETAILED DESCRIPTION

Figure 1:
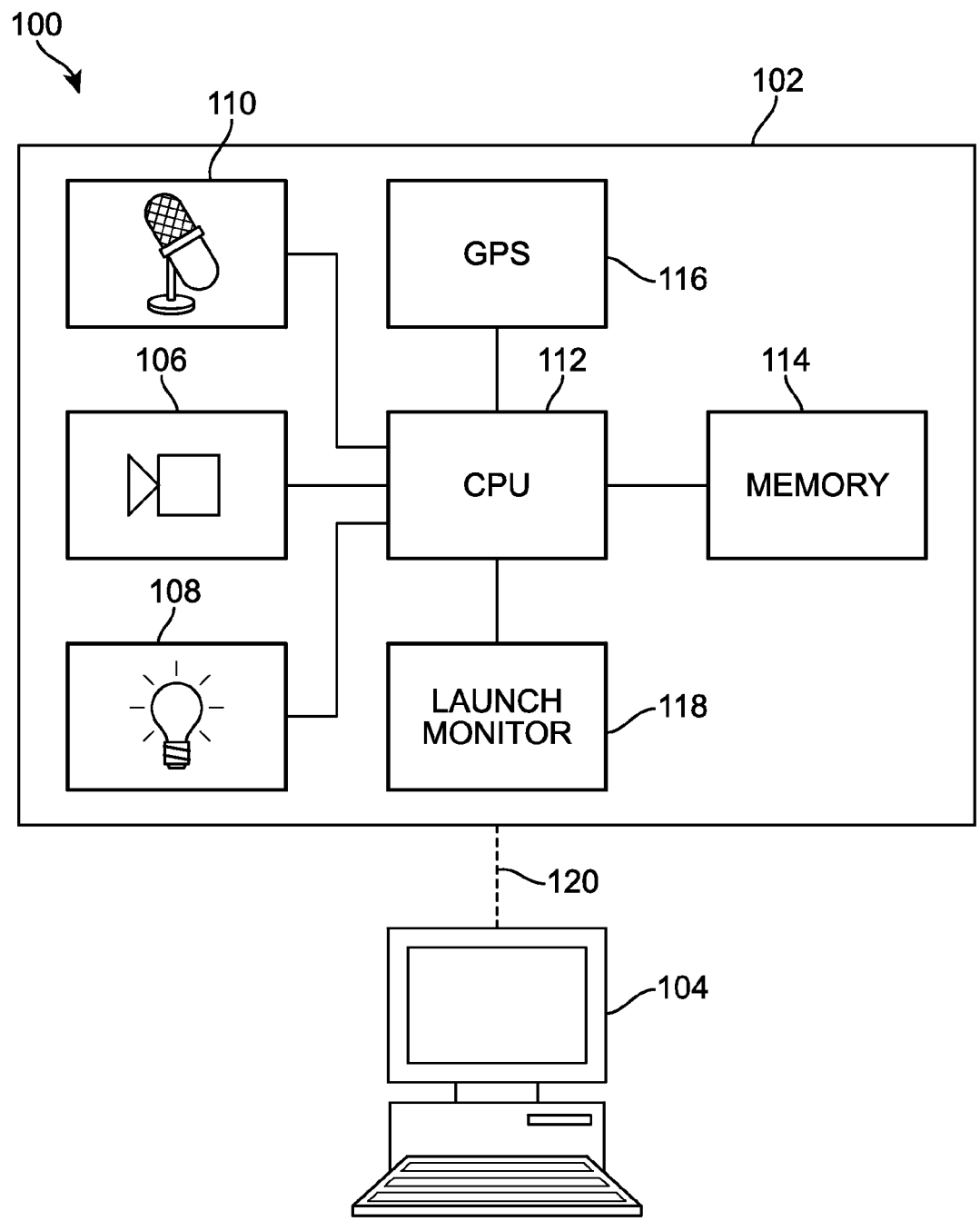
FIG. 1 is a schematic view of an exemplary embodiment of a system including a portable movement capture device.

FIG. 1 is a schematic view of an exemplary embodiment of a system 100 including a portable movement capture device. In some embodiments, system 100 may be configured to capture information associated with a player performing a sports activity. System 100 may include a portable movement capture device 102. In an exemplary embodiment, portable movement capture device 102 may include one or more components that are configured to capture and/or record information associated with a player performing a sports activity, as further detailed below. In one embodiment, portable movement capture device 102 may be configured to capture a golf swing of a golfer.

System 100 may also include a computer 104. In various embodiments, computer 104 may include, but is not limited to: a desktop computer, portable computer, tablet computer, smartphone, a processor disposed in a digital camera, and/or any other device including a processor and/or a display that is configured to allow a user to view and/or interact with information. With this arrangement, a user may use computer 104 to view and/or interact with the information obtained with portable movement capture device 102. In one embodiment, computer 104 may be configured to allow a user to analyze a captured golf swing of a golfer.

In some embodiments, computer 104 may be associated with portable movement capture device 102 so as to transfer the captured information from portable movement capture device 102 to computer 104. In this embodiment, a connection 120 may be provided to allow information transfer to and/or from computer 104 and portable movement capture device 102. Connection 120 may be any type of connection used to transfer information between two devices, including, but not limited to USB, Firewire, Ethernet, WiFi, Bluetooth, TCP/IP, as well as any other known wireless or wired connection type. In some cases, connection 120 may be part of a local area network (LAN). In other cases, computer 104 and portable movement capture device 102 may be distant from each other and connection 120 may be part of a wide area network (WAN). In other embodiments, computer 104 may be integrated with portable movement capture device 102, as discussed in later embodiments below.

In some embodiments, portable movement capture device 102 may include one or more components that are configured to capture and/or record information associated with a player performing a sports activity. Different embodiments of portable movement capture device 102 may include different components. Any of the following components associated with portable movement capture device 102 may be considered optional in some embodiments. Some embodiments may include a given component, while others may exclude it. The following description discloses many of the possible components that may be used with portable movement capture device 102, however, it should be kept in mind that not every component must be used in a given embodiment.

In an exemplary embodiment, portable movement capture device 102 may include one or more sensors for capturing various information associated with a player performing a sports activity. In one embodiment, portable movement capture device 102 may be configured to capture information associated with a golf swing of a golfer. In this embodiment, portable movement capture device 102 includes components or sensors that are configured to record information associated with a golf swing. In one embodiment, portable movement capture device 102 may include a camera 106. Camera 106 may be a high-speed camera capable of recording audio and/or visual information. In some cases, camera 106 may record video. In other cases, camera 106 may record multiple still images taken at a rapid rate.

In still other cases, camera 106 may be configured to capture three-dimensional images and/or video. For example, in some embodiments a 3D camera including multiple lenses may be configured to capture three-dimensional images and/or video. In another embodiment, multiple cameras may be disposed at different locations to capture different views of an object used to create composite three-dimensional images and/or video.

In addition, in some embodiments, camera 106 may include a processor and/or a display that may perform some or all of the functions associated with computer 104, described above, and/or CPU 112, described below.

In some embodiments, portable movement capture device 102 may include a light source 108. In an exemplary embodiment, light source 108 may provide lighting for camera 106. In one embodiment, light source 108 may include one or more arrays of LED lighting elements. With this arrangement, camera 106 may be provided with sufficient lighting to capture the movement of a player performing a sports activity. In addition, in some embodiments, portable movement capture device 102 may include a microphone 110. In some cases, microphone 110 may be used to detect a sound associated with a player performing a sports activity. For example, in the case where portable movement capture device 102 is used to capture a golf swing, microphone 110 may be used to detect the sound of a golf club hitting a golf ball. As described in more detail below, microphone 110 may be used as a trigger to starting capturing information using camera 106. In other cases, microphone 110 may be used to record audio associated with a player performing a sports activity for analysis. For example, in the case where portable movement capture device 102 is used to capture a golf swing, microphone 110 may be used to record the sound of a golf club hitting a golf ball for further analysis. A T-shaped microphone array that may be used to record the sound of a golf club hitting a golf ball for further analysis is disclosed in U.S. patent application Ser. No. 13/048,665, entitled "Microphone Array and Method of Use", filed on Mar. 15, 2011, which application is hereby incorporated by reference in its entirety.

In some embodiments, portable movement capture device 102 may include a central processing unit (CPU) 112. CPU 112 may be a microprocessor or other computer that is configured to control one or more components of portable movement capture device 102. In addition, CPU 112 may include a number of ports that facilitate the input and output of information and power between the various components of portable movement capture device 102. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In some cases, CPU 112 may be integral with another component of portable movement capture device 102, including camera 106. In other cases, CPU 112 may be a separate computer or processor. In still other cases, one or more tasks performed by CPU 112 may be performed using computer 104, either alone or in combination with CPU 112.

In some embodiments, portable movement capture device 102 may include a memory 114. In an exemplary embodiment, memory 114 may be configured to store information obtained from one or more of the components associated with portable movement capture device 102. In one embodiment, CPU 112 may communicate with memory 114. Memory 114 may include any kind of storage device, including but not limited to: magnetic, optical, magneto-optical, and/or memory, including volatile memory and non-volatile memory. In some embodiments, memory 114 may be integral with CPU 112. In other embodiments, memory 114 may separate from CPU 112 and communicate with CPU 112. In addition, in some embodiments, memory 114 may be used to supplement memory associated with one or more individual components of portable movement capture device 102. In one embodiment, memory 114 may be configured to store captured information obtained from camera 106 and/or microphone 110. In still other embodiments, memory 114 may be separate from portable movement capture device 102 and may communicate with portable movement capture device 102 through a connection, including any of the connection types discussed above in reference to connection 120.

In some embodiments, portable movement capture device 102 may include additional components configured to obtain information associated with a player performing a sports activity. In an exemplary embodiment, portable movement capture device 102 may include a GPS receiver 116 for receiving GPS information. In an exemplary embodiment, GPS receiver 116 may be used for gathering GPS information associated with a player performing a sports activity, including location information and time information that may be used by CPU 112 and/or other components of portable movement capture device 102.

In some embodiments, portable movement capture device 102 may further include a conventional golf ball launch monitor 118. Launch monitor 118 may be configured to measure parameters associated with various characteristics of the interaction of a golf club head and golf ball upon impact and/or a golf ball's flight, including, but not limited to: initial velocity, launch direction, spin rates, spin directions, club head speed, club head orientation at ball impact, and other parameters associated with a golf ball struck by a golf club. In some embodiments, launch monitor 118 may include one or more sensors that are configured to detect these parameters and generate data. In various embodiments, launch monitor 118 may include one or more of a CCD sensor, radar sensor, laser, IR sensor, and other known sensors used to determine data associated with a golf ball struck by a golf club. Launch monitor 118 may transfer data obtained by its sensors to CPU 112 and/or other components of portable movement capture device 102.

In various embodiments, portable movement capture device 102 may include additional elements and components. In some embodiments, portable movement capture device 102 may include a power source (not pictured) for providing power to one or more components. Any known type of power source may be used, including, but not limited to a battery and/or an NC power supply. In an exemplary embodiment, portable movement capture device 102 may include a rechargeable battery. In addition, one or more individual components of portable movement capture device 102 may be configured with a separate power source. For example, in some cases, camera 106 may be provided with a separate power source. In other embodiments, portable movement capture device 102 and/or CPU 112 may also include additional memory, data storage provisions including one or more databases and/or one or more processors, as well as other ports for communicating with additional components or devices associated with portable movement capture device 102 and/or system 100.

In some embodiments, all or most of the components shown in FIG. 1 associated with portable movement capture device 102 may be housed in a single case or unit. In other embodiments, the various components shown in FIG. 1 are not housed in a single physical case, but instead, are distributed as one or more separate components and may communicate with one another via known wired or wireless methods. For example, in one embodiment, light source 108 may be provided separately from portable movement capture device 102. In another embodiment, one or more of camera 106 and/or microphone 110 may be provided separately from portable movement capture device 102. In an exemplary embodiment, described in more detail below, camera 106 may be removable from portable movement capture device 102.

Figure 2:
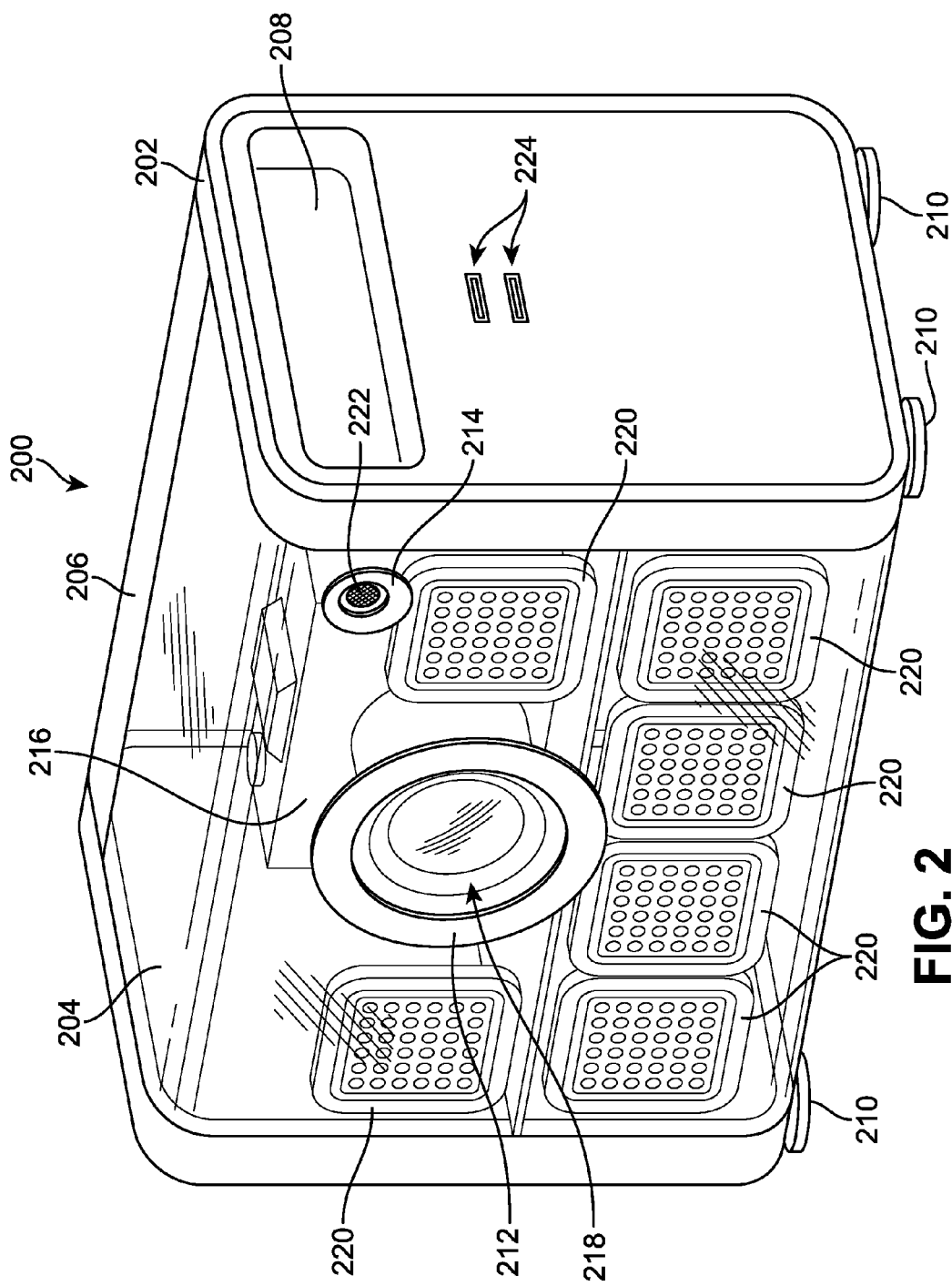
FIG. 2 is an isometric front view of an exemplary embodiment of a portable movement capture device.
Figure 3:
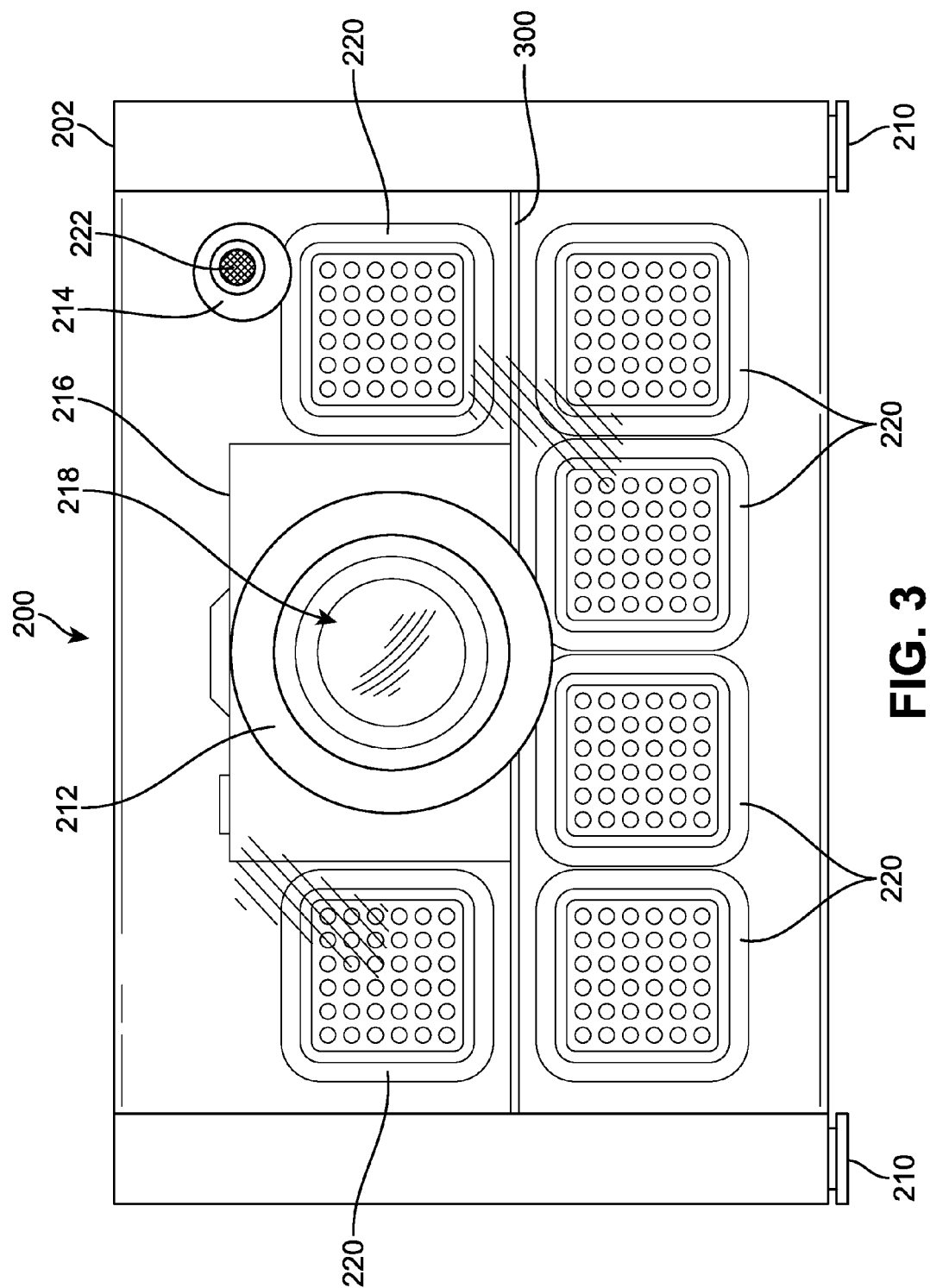
FIG. 3 is a front view of an exemplary embodiment of a portable movement capture device.

FIGS. 2 through 5 illustrate different views of an exemplary embodiment of a portable movement capture device configured to be contained within a single housing. Referring now to FIGS. 2 and 3, front views of an exemplary embodiment of a portable movement capture device 200 are illustrated.

In this embodiment, portable movement capture device 200 is contained within a single housing 202. Housing 202 may be made of any material. In an exemplary embodiment, housing 202 may be made of any one or combination of metal, plastic, wood, as well as any other materials suitable for constructing a housing. In an exemplary embodiment, housing 202 may be configured with a generally rectangular shape. In other embodiments, however, housing 202 may be other shapes. Housing 202 may include one or more panels disposed on different portions of housing 202. In some embodiments, housing 202 may include a front panel 204. In an exemplary embodiment, front panel 204 may be made of a generally transparent material. Some materials that may be used to make front panel 204 include acrylic, polycarbonate, glass, as well as other transparent or semi-transparent materials. With this arrangement, components within the interior of housing 202 may be visible outside of portable movement capture device 200. For example, lighting elements 220 disposed within the interior of housing 202 can pass light through a transparent or semi-transparent front panel. In other embodiments, front panel 204 need not be made of a transparent material and may be made of any material used to make housing 202.

Housing 202 may also include a rear panel 206. In an exemplary embodiment, rear panel 206 may be made of a generally opaque material. In some embodiments, rear panel 206 may be made of any material used to make housing 202, including, but not limited to any one or combination of metal, plastic, wood, as well as any other materials suitable for constructing a panel. In some embodiments, housing 202 may include provisions configured to facilitate the portability of portable movement capture device 200. In an exemplary embodiment, housing 202 may include a handle 208. Handle 208 may be disposed on opposite sides of portable movement capture device 200 to assist a user with carrying portable movement capture device 200.

In some embodiments, housing 202 may include one or more provisions configured to contact a ground surface. In an exemplary embodiment, housing 202 may include one or more ground-engaging members 210. Ground-engaging members 210 may be disposed along a bottom of housing 202 and may be configured to come into contact with a ground surface. In addition, ground-engaging members 210 may be configured to be manually or automatically adjustable so as to allow individual ground-engaging members to move up or down. With this arrangement, portable movement capture device 200 may be kept at a desired angle, even on an uneven ground surface. In addition, in some embodiments, portable movement capture device 200 may be provided with an automatic level sensor that is configured to automatically adjust one or more of ground-engaging members 210 to level portable movement capture device 200 or to keep portable movement capture device 200 at a desired angle.

In some embodiments, housing 202 may be configured with one or more openings in front panel 204 and/or rear panel 206. An opening may be provided in housing to allow better reception for a sensor that is disposed within an interior of housing 202. In an exemplary embodiment, front panel 204 may include a lens opening 212. Lens opening 212 may be a generally circular opening disposed in the center of front panel 204 that is configured to correspond to a lens 218 of a camera 216. With this arrangement, lens opening 212 may be configured to allow lens 218 to obtain video and/or images without interference from the material of front panel 204.

In an exemplary embodiment, front panel 204 may also include a microphone opening 214. Microphone opening 214 may be a generally circular opening disposed on front panel 204 that is configured to correspond to a microphone 222. In this embodiment, portable movement capture device 200 includes a single microphone opening 214 to accommodate a single microphone 222. In other embodiments, however, where multiple microphones are disposed within portable movement capture device 200, additional microphone openings may be disposed on front panel 204, rear panel 206, and/or other portions of housing 202.

In some embodiments, portable movement capture device 200 may include one or more components disposed within the interior of housing 202. In different embodiments, the components disposed within housing 202 may be any combination of components discussed above in reference to portable movement capture device 102. The embodiments illustrated in FIGS. 2 through 5 include one possible combination of components that may be disposed within housing 202 of portable movement capture device 200, however, it should be understood that additional or different components may be included in different embodiments.

In an exemplary embodiment, portable movement capture device 200 may include components disposed within the interior of housing 202 that are configured to capture information associated with a golf swing of a golfer. In this embodiment, portable movement capture device 200 includes components or sensors that are configured to record information associated with a golf swing. In one embodiment, portable movement capture device 200 includes camera 216 including lens 218 that may be disposed through lens opening 212 in front panel 204. Camera 216 may be any type of camera, including camera 106, discussed above. In some embodiments, camera 216 may be a professional camera. In other embodiments, camera 216 may be a consumer camera available to purchase at a retail store.

In this embodiment, camera 216 is a high-speed camera that is configured to take video and/or still images at a rapid rate. In one embodiment, camera 216 may capture information at a rate from 600 to 1200 frames per second. In other embodiments, camera 216 may capture information at a higher or lower frame rate. In some cases, camera 216 may capture information at a rate from 200 to 600 frames per second. In other cases, camera 216 may capture information at a rate from 1200 to 2000 frames per second or greater.

In some embodiments, portable movement capture device 200 may include a plurality of lighting elements 220. Lighting elements 220 may be any type of light source, including light source 108, discussed above. In an exemplary embodiment, lighting elements 220 may provide lighting for camera 216. In this embodiment, lighting elements 220 include arrays of LED lighting elements. With this arrangement, camera 216 may be provided with sufficient lighting to capture the movement of a golf swing of a golfer. In this embodiment, portable movement capture device 200 includes six lighting elements 220. In other embodiments, however, a greater or smaller number of lighting elements may be included.

In some embodiments, portable movement capture device 200 also may include microphone 222. Microphone 222 may be any type of microphone, including microphone 110, discussed above. In this embodiment, microphone 222 may be disposed through microphone opening 214 in front panel 204. In some cases, microphone 222 may be used to detect the sound of a golf club hitting a golf ball. In an exemplary embodiment, microphone 222 may be used as a trigger to starting capturing information using camera 216. When microphone 222 detects the sound of the golf club striking the golf ball, a trigger signal may be transmitted from microphone 222 to camera 216. Camera 216 may use the trigger signal to start recording and/or capturing information. In some embodiments, camera 216 may already be recording and/or capturing information that is temporarily stored in a memory buffer. When the trigger signal is received by camera 216 and/or a CPU in communication with camera 216, a portion of the memory buffer may be saved to a memory for further analysis.

In other cases, microphone 222 may be used to record audio associated with a golf swing. For example, in one embodiment, microphone 222 may be a T-shaped microphone array, discussed above, that is configured to record the sound of a golf club hitting a golf ball for further analysis.

In other embodiments, an optical sensor, including, but not limited to a CCD device, may be used to generate a trigger signal. The optical sensor may be configured to detect motions of a golfer associated with the beginning of a golf swing and generate a trigger signal, as described above. In some cases, the optical sensor may be used instead of microphone 222 to generate the trigger signal. In other cases, the optical sensor may be used together with the microphone to generate the trigger signal. In other embodiments, the optical sensor is optional and may be omitted.

In some embodiments, portable movement capture device 200 may include provisions for transferring information from one or more of the components within the interior of housing 202. In an exemplary embodiment, portable movement capture device 200 may include one or more data transfer ports 224 that are disposed in housing 202. In this embodiment, data transfer ports 224 allow captured and/or recorded information obtained from camera 216 and/or microphone 222 to be transferred to another computer for further analysis. In addition, in cases where portable movement capture device 200 includes a CPU and/or additional memory, data transfer ports 224 may further allow communication with the CPU and/or memory. In an exemplary embodiment, data transfer ports 224 may include any type of connection, including connection 120, as discussed above. In this embodiment, data transfer ports 224 are USB connections. In other embodiments, however, data transfer ports 224 may be different types of wired or wireless connections.

In some embodiments, the components disposed within the interior of housing 202 of portable movement capture device 200 may be arranged to better capture information associated with a golf swing of a golfer. In an exemplary embodiment, portable movement capture device 200 may include ground-engaging members 210 that are configured for engaging with a ground surface so portable movement capture device 200 may be disposed at ground level. With this arrangement, camera 216 may capture information associated with a golf club and golf ball taken from a line of sight that is on an approximately level plane with the golf club and golf ball. In other embodiments, camera 216 may have a line of sight that is above or below the plane of the golf club and golf ball. In one embodiment, ground-engaging members 210 may be configured to move up or down, as discussed above, to adjust the height of portable movement capture device 200 and/or to change the line of sight of camera 216.

In an exemplary embodiment, the interior of housing 202 may include a shelf 300. Shelf 300 may be configured to hold one or more components within the interior of housing 202 of portable movement capture device 200. In this embodiment, camera 216 is disposed on shelf 300 to assist with holding camera 216 at a line of sight that is near ground level. In one embodiment, shelf 300 may hold camera 216 approximately 6 to 12 inches above a ground surface. Shelf 300 also may be configured to hold other components within the interior of housing 202. In this embodiment, two individual lighting elements of lighting elements 220 may be disposed on shelf 300. In some embodiments, additional lighting elements 220 may be disposed below shelf 300. In addition, shelf 300 may hold additional components that are not shown in the Figures, including, but not limited to cables connecting one or more components, circuit boards, power source(s), CPU, memory, as well as any other components.

Figure 4:
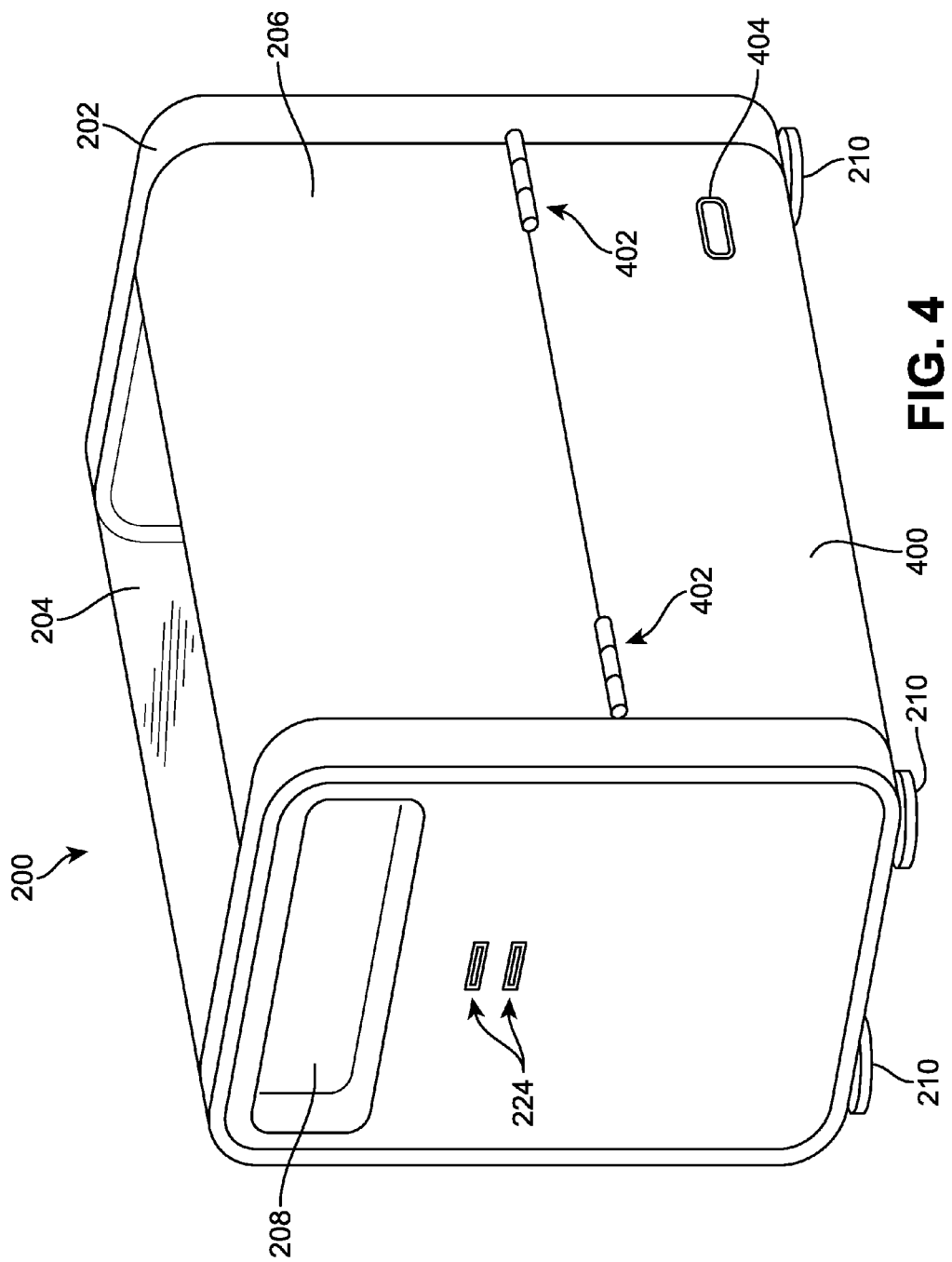
FIG. 4 is an isometric rear view of an exemplary embodiment of a portable movement capture device.
Figure 5:
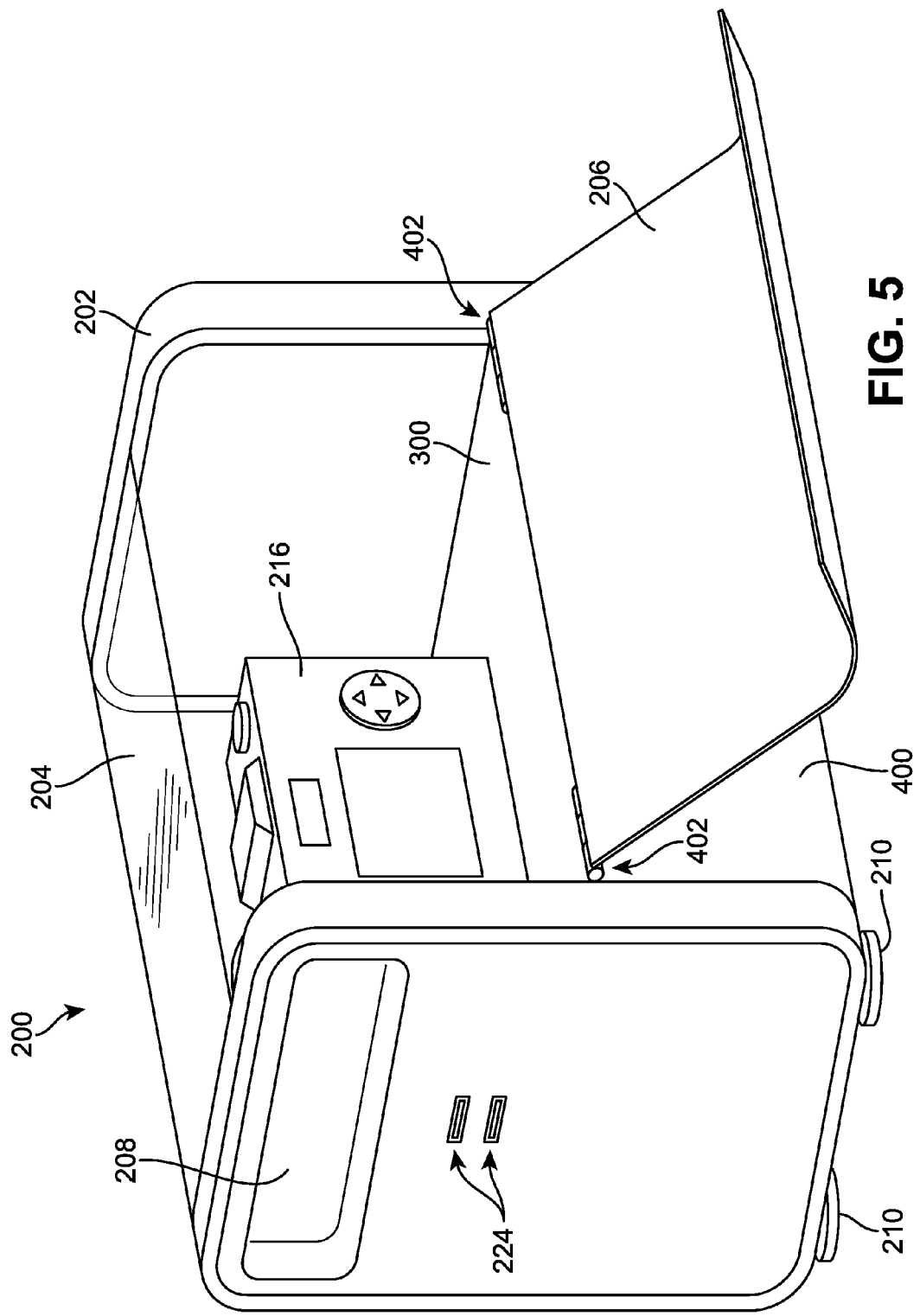
FIG. 5 is an isometric rear view of an exemplary embodiment of a portable movement capture device.

FIGS. 4 and 5 illustrate rear views of portable movement capture device 200. In some embodiments, housing 202 of portable movement capture device 200 may be configured to open to allow access to the interior of housing 202. With this arrangement, camera 216 and/or any of the other components within housing 202 may easily be accessed and/or removed. In this embodiment, the backside of portable movement capture device 200 is shown. The backside of housing 202 may include rear panel 206, as discussed above, and a bottom panel 400. Bottom panel 400 may be a portion of the backside of housing 202 that is made of a similar material as rear panel 206. In an exemplary embodiment, rear panel 206 may be configured to open to allow access to the interior of housing 202. In this embodiment, rear panel 206 may be attached to bottom panel 400 using one or more hinges 402. Hinges 402 are configured to allow rear panel 206 to open to allow access to the interior of housing 202 while remaining attached to bottom panel 400 of housing 202. In other embodiments, rear panel 206 may be completely removable from bottom panel 400 and/or housing 202.

In some embodiments, portable movement capture device 200 may include a power button 404. Power button 404 may be associated with a power source and can be configured to control transitioning portable movement capture device 200 between an on state and an off state. In an exemplary embodiment, power button 404 may be associated with a CPU that controls one or more components within portable movement capture device 200. With this arrangement, power button 404 may be used to instruct the CPU to ready portable movement capture device 200 into an active or on state for capturing information and/or for entering a standby or off state.

Referring now to FIG. 5, in this embodiment, rear panel 206 is shown in an open position to allow access to the interior of housing 202. In some embodiments, rear panel 206 is hinged to bottom panel 400 at hinges 402. This configuration allows housing 202 of portable movement capture device 200 to be opened to access one or more of the components disposed within. In an exemplary embodiment, rear panel 206 may open to allow camera 216 to be removed from within the interior of housing 202. With this arrangement, camera 216 need not be permanently associated with portable movement capture device 200. In different embodiments, camera 216 may include any type of camera discussed above in reference to camera 106, and may be used as part of portable movement capture device 200 as well as separately without portable movement capture device 200.

Figure 6:
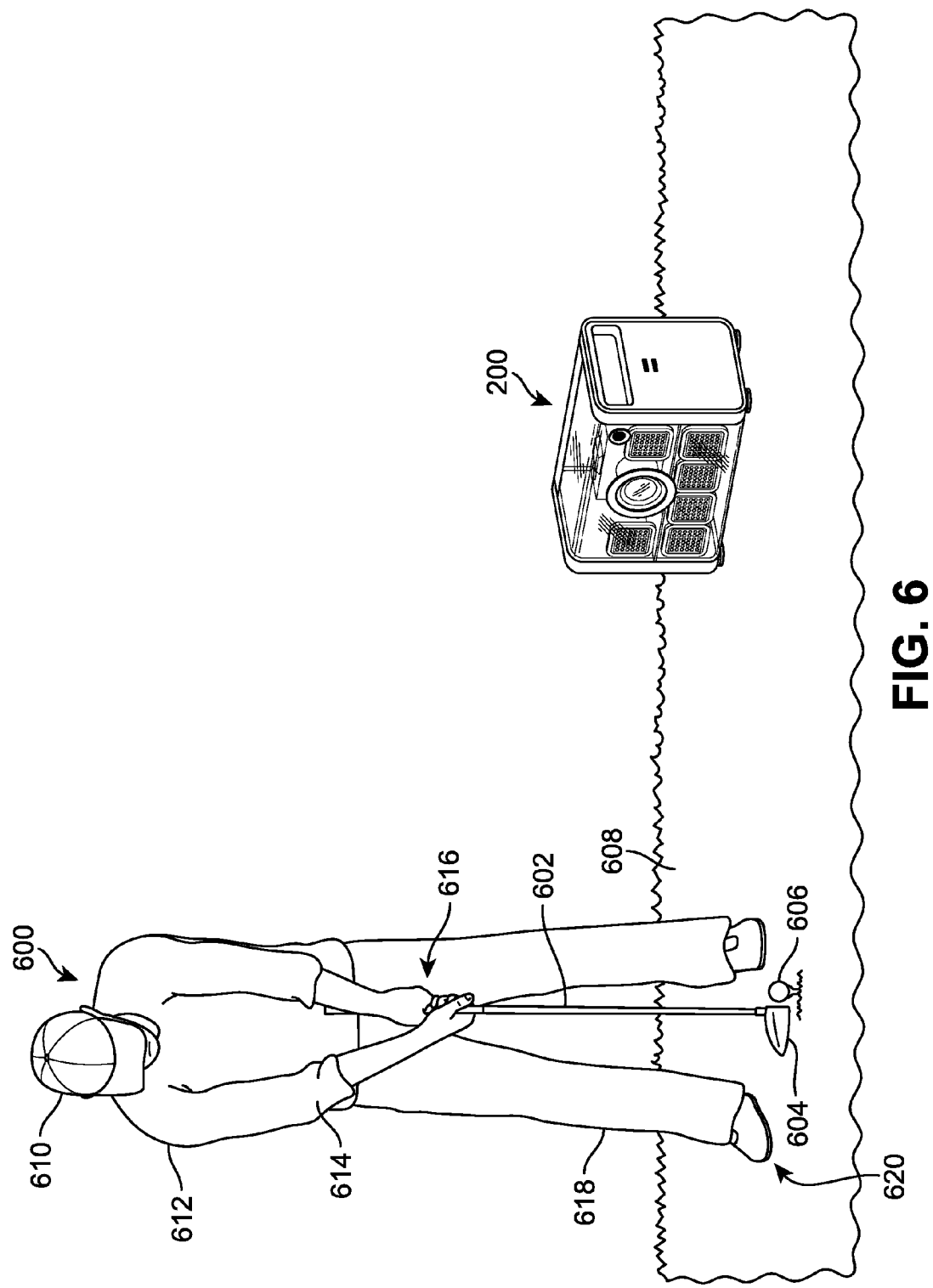
FIG. 6 is a schematic view of an exemplary process of capturing a golf swing using a portable movement capture device.
Figure 7:
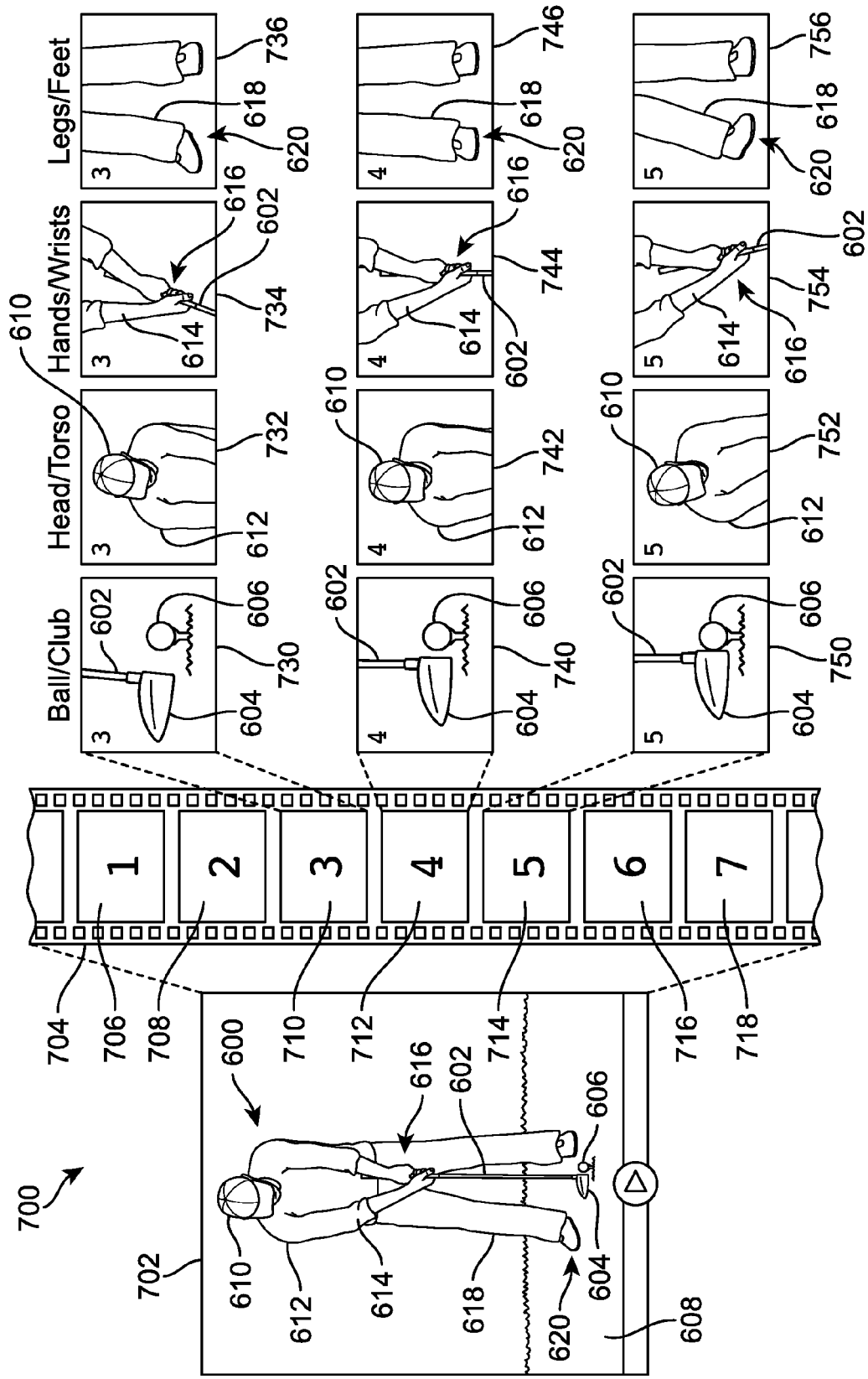
FIG. 7 is a representational view of an exemplary process of finite element analysis of a captured golf swing.

FIGS. 6 and 7 illustrate a process of capturing a golf swing using portable movement capture device 200 and a process of finite element analysis of the captured golf swing. Referring now to FIG. 6, portable movement capture device 200 may be used to capture information associated with the golf swing of a golfer 600. In some embodiments, portable movement capture device 200 may be used to capture information associated with any one or more of a golf club 602, a club head 604, and/or a golf ball 606 when struck by golfer 600 during a golf swing. Such information can include initial velocity, launch direction, spin rates, spin directions, club head speed, club head orientation at ball impact, and other parameters associated with golf club 602, club head 604, and/or golf ball 606.

In an exemplary embodiment, portable movement capture device 200 may also capture information associated with one or more regions of golfer 600 during a golf swing. Typically, a golf swing is a complex interaction of moving body parts that are coordinated for the purpose of swinging a golf club to strike a golf ball. During this process, different regions of a golfer's body may be moving in different ways that can have an effect on the interaction between the golf club and golf ball. Accordingly, portable movement capture device 200 may be used to capture information associated with various regions of a golfer's body during a golf swing.

Generally, golfer 600 may be described with reference to a plurality of different regions. In this embodiment, golfer 600 may be described as having a head region 610, a shoulder region 612, an arm region 614, a hand region 616, a leg region 618, and a foot region 620. Each region may identify one or both sides of golfer 600. In other words, shoulder region 612 may be associated with either a right or left shoulder region, or may be associated with both right and left shoulder regions. Similarly, arm region 614, hand region 616, leg region 618, and/or foot region 620 may be associated with both right and left sides or only a single left or right side of golfer 600. While certain regions have been identified in this description, it should be understood that other regions may be described or isolated for analysis of a golf swing.

In an exemplary embodiment, portable movement capture device 200 may be set upon a ground surface 608. As discussed above, one or more ground-engaging members on portable movement capture device 200 may be adjusted up or down in height to adjust the line of sight of the camera disposed within portable movement capture device 200. With this arrangement, portable movement capture device 200 may be configured to capture information associated with one or more regions associated with golfer 600. In an exemplary embodiment, portable movement capture device 200 may be arranged on ground surface 608 so that substantially all of golfer 600, including head region 610, shoulder region 612, arm region 614, hand region 616, leg region 618, and foot region 620, as well as golf club 602, club head 604 and/or golf ball 606, are within the line of sight of the camera disposed in portable movement capture device 200. In other embodiments, however, more or less of golfer 600 may be within the line of sight of portable movement capture device 200.

An exemplary embodiment of a process for using portable movement capture device 200 to capture information associated with a golf swing of golfer 600 will be described. Once portable movement capture device 200 is placed on ground surface 608 in position near golfer 600 with the desired line of sight to capture information, it may be readied for capturing information. In one embodiment, readying portable movement capture device 200 may include turning on power to one or more components associated with portable movement capture device 200, for example by pressing power button 404, described above. In other embodiments, portable movement capture device 200 may be turned on and/or readied to capture information using a wired or wireless remote control.

In an exemplary embodiment, camera 216 disposed within portable movement capture device 200 may be a high-speed camera that is configured to record a series of high-speed images and/or video of golfer 600 striking golf ball 606 with golf club 602. In some cases, microphone 222 disposed within portable movement capture device 200 may be configured to generate a trigger signal that is associated with the sound of golf ball 606 being struck by club head 604 of golf club 602. In this embodiment, the trigger signal generated by microphone 222 is used by camera 216 and/or a CPU associated with portable movement capture device 200 to capture information associated with the golf swing.

In one embodiment, camera 216 may be configured to continuously record video and/or take rapid high-speed still images of golfer 600 during the golf swing. The information captured by camera 216 may be temporarily stored in a buffer memory. In this case, the trigger signal from microphone 222 may cause a predetermined amount of the buffered video and/or still images from camera 216 to be saved to memory for further analysis. In an exemplary embodiment, approximately three seconds of buffered video and/or still images prior to detection of the trigger signal may be saved to memory upon detection of the trigger signal. Similarly, approximately the same amount of buffered video and/or still images from after the detection of the trigger signal may be saved to memory. With this arrangement, camera 216 may continuously record golfer 600, but may only keep the captured information associated with a small time period before and after the sound of the golf ball striking the golf club. In other embodiments, the predetermined amount of buffered video and/or still images may be associated with more or less time before and/or after detection of the trigger signal. In addition, in this embodiment, while the trigger signal may be determined by using microphone 222 to detect the sound of golf ball 606 being struck by club head 604 of golf club 602, in other embodiments, different methods of detecting a trigger signal may be used. For example, in some embodiments, the trigger signal may be manually generated by a user of portable movement capture device 200 and/or by golfer 600 prior to taking a swing.

Furthermore, in embodiments where a microphone is included in portable movement capture device 200 that is configured to record the sounds associated with the golf ball being struck by the golf club for further analysis, a similar method of storing captured information in a buffered memory may be used. In some embodiments, a microphone disposed in portable movement capture device 200 may be used to detect a trigger signal and to record information associated with the swing of golfer 600.

Referring now to FIG. 7, a process 700 of finite element analysis of a captured golf swing is illustrated. In an exemplary embodiment, information associated with a golf swing may be captured as explained above. In some embodiments, process 700 may be performed using a display to view the captured information. In some cases, the display may be associated with a separate component from portable movement capture device 200, such as a display associated with a computer, including computer 104, discussed above. In other cases, the display may be integrated with portable movement capture device 200, such as discussed in the embodiments below.

In some embodiments, process 700 may include receiving captured information 702 from portable movement capture device 200. In this embodiment, captured information 702 includes video information 704 from camera 216. In other embodiments, captured information 702 may additionally or optionally include audio information from one or more microphones.

In an exemplary embodiment, finite element analysis of captured information 702 may include analyzing a portion of video information 704. In this embodiment, video information 704 includes a series of frames captured by camera 216. In particular, where camera 216 is a high-speed camera, thousands of frames per second may be captured and stored as video information 704. In this embodiment, finite element analysis of video information 704 includes analyzing only a subset of the entire video information 704. In some cases, a processing algorithm may be applied to video information 704 using a CPU or computer to automatically identify the subset of video information 704 for analysis. In other cases, a user may manually isolate a subset of video information 704 for analysis.

In this embodiment, video information 704 may include a plurality of frames of captured golf swing images, including a first frame 706, a second frame 708, a third frame 710, a fourth frame 712, a fifth frame 714, a sixth frame 716, and a seventh frame 718. It should be understood that each frame illustrated in FIG. 7 may be representational of more than a single frame of video information 706. For example, each frame may represent a group of tens, hundreds, or thousands of frames. In this embodiment, a subset of video information 704 may be isolated for further analysis that includes third frame 710, fourth frame 712, and fifth frame 714. The remaining portion of video information 704, including first frame 706, second frame 708, sixth frame 716, and/or seventh frame 718, may be discarded or ignored during further analysis of the subset of video information 704. With this arrangement, process 700 may apply finite element analysis to captured information 702 to isolate and select only a subset of video information 704 that is of interest to a user and/or a golfer.

In some embodiments, process 700 may include further finite element analysis to the subset of video information 704 associated with third frame 710, fourth frame 712, and fifth frame 714. In an exemplary embodiment, the subset of video information 704 may be isolated to one or more regions of interest. In one embodiment, substantially all of golfer 600 or any one or more regions of golfer 600, including head region 610, shoulder region 612, arm region 614, hand region 616, leg region 618, and foot region 620, as well as golf club 602, club head 604 and/or golf ball 606, may be isolated for further analysis.

In some embodiments, one or more adjacent regions may be grouped together for isolation and/or analysis. In an exemplary embodiment, video information 704 may be configured to isolate captured information 702 associated with a first region corresponding to golf club 604 and golf ball 606, a second region corresponding to head region 610 and shoulder region 612, a third region corresponding to arm region 614 and hand region 616, and/or a fourth region corresponding to leg region 618 and foot region 620. In this embodiment, a first region 730 of third frame 710 may isolate video information 704 corresponding to golf club 604 and golf ball 606, a second region 732 of third frame 710 may isolate video information 704 corresponding to head region 610 and shoulder region 612, a third region 734 of third frame 710 may isolate video information 704 corresponding to arm region 614 and hand region 616, and/or a fourth region 736 of third frame 710 may isolate video information 704 corresponding to leg region 618 and foot region 620.

In an exemplary embodiment, a similar grouping may be applied to the remaining frames associated with the subset of video information 704 that is selected for further analysis. In this embodiment, a first region 740 of fourth frame 712 may isolate video information 704 corresponding to golf club 604 and golf ball 606, a second region 742 of fourth frame 712 may isolate video information 704 corresponding to head region 610 and shoulder region 612, a third region 744 of fourth frame 712 may isolate video information 704 corresponding to arm region 614 and hand region 616, and/or a fourth region 746 of fourth frame 712 may isolate video information 704 corresponding to leg region 618 and foot region 620. In addition, a first region 750 of fifth frame 714 may isolate video information 704 corresponding to golf club 604 and golf ball 606, a second region 752 of fifth frame 714 may isolate video information 704 corresponding to head region 610 and shoulder region 612, a third region 754 of fifth frame 714 may isolate video information 704 corresponding to arm region 614 and hand region 616, and/or a fourth region 756 of fifth frame 714 may isolate video information 704 corresponding to leg region 618 and foot region 620. Process 700 may include similar groupings applied to any number of frames that are part of the subset of video information 704 that is isolated and selected for further analysis.

By isolating individual regions and/or groupings of regions associated with captured information 702, process 700 may be configured to allow finite element analysis of a golfer's swing. Each isolated region of each frame permits a user to observe the portion of the golf swing associated with that region in a piecemeal fashion. In other words, by allowing a user to isolate and analyze specific regions of a golfer during a golf swing, the complex interaction of moving body parts may be analyzed either individually or together with other isolated regions.

For example, a user may use finite element analysis according to process 700 to analyze the relationship between golf club 602, club head 604, and golf ball 606 as captured in first region 730 of third frame 710, first region 740 of fourth frame 712, and first region 750 of fifth frame 714, alone, or relative to another region, such as second region 732 of third frame 710, second region 742 of fourth frame 712, and second region 752 of fifth frame 714. With this arrangement, a user may use finite element analysis to compare the relationship between movement of head region 610 and/or shoulder region 612 relative to the movement of golf club 602, club head 604, and golf ball 606. Similar relative comparisons may be made between any one or more of the regions associated with golfer 600 contained in captured information 702.

For example, in another embodiment, a user may use finite element analysis according to process 700 to analyze the relative relationship between movement of arm region 614 and/or hand region 616 as captured in third region 734 of third frame 710, third region 744 of fourth frame 712, and third region 754 of fifth frame 714, alone, or relative to leg region 618 and/or foot region 620 as captured in fourth region 736 of third frame 710, fourth region 746 of fourth frame 712, and fourth region 756 of fifth frame 714. It should be understood that relative comparisons may be made between any one or more of the regions associated with golfer 600 contained in captured information 702, either alone as isolated portions of video information 704, or together as a composite portion of captured information 702.

In some embodiments, process 700 may be performed using captured information 702 obtained from a single camera and individual regions and/or groupings of regions associated with a golf swing of a golfer may be isolated from the overall captured information 702. In other embodiments, however, multiple cameras may be used to capture information associated with the individual regions and/or groupings of regions associated with a golf swing of a golfer, as further described in the embodiments below. In some cases, the multiple cameras may be used to capture information associated with different regions of interest associated with a golf swing of a golfer from each camera. In other cases, the multiple cameras may be used to capture information associated with the same region of interest from different viewing angles or lines of sight from each camera. In still other cases, multiple cameras may be used to capture information from one or more different regions and one or more of the same regions from different viewing angles or lines of sight. In each case, process 700 may be used in a similar manner to perform finite element analysis on the captured information from one camera or multiple cameras.

In previous embodiments, a portable movement capture device that is configured to fit inside a housing and rest upon a ground surface has been described. In other embodiments, one or more components comprising a portable movement capture device may be configured as a handheld device. Referring now to FIGS. 8 through 12, an exemplary embodiment of a portable movement capture device that is configured as a handheld movement capture device 800 is illustrated.

In some embodiments, handheld movement capture device 800 may be configured with a size and shape so as to fit within a hand of a user. In an exemplary embodiment, handheld movement capture device 800 may be an approximately rectangular shape and may be substantially similar in size to a point-and-shoot camera. In other embodiments, however, handheld movement capture device 800 may be configured with other shapes and/or sizes.

Figure 8:
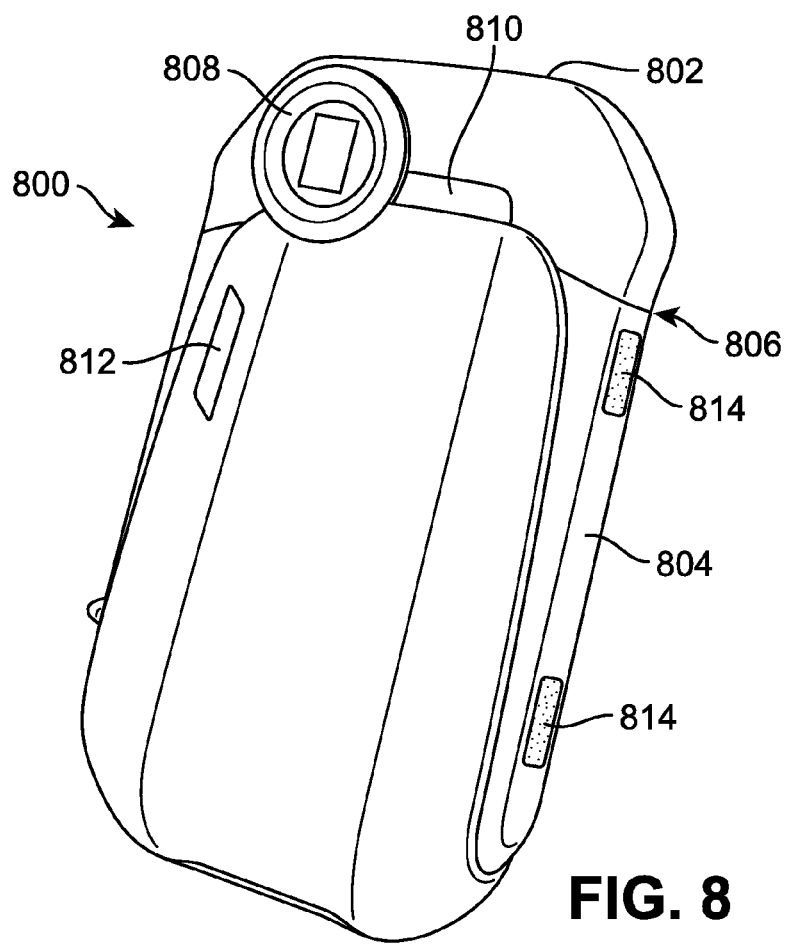
FIG. 8 is an isometric front view of an alternate embodiment of a portable movement capture device.
Figure 9:
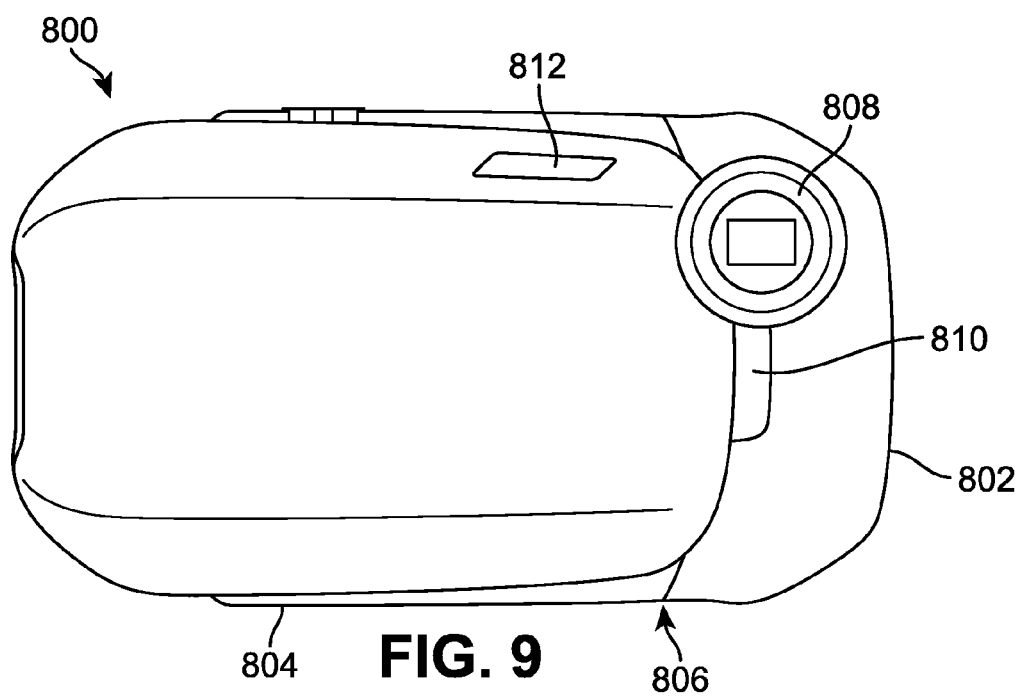
FIG. 9 is a front view of an alternate embodiment of a portable movement capture device.

Referring now to FIGS. 8 and 9, in this embodiment, handheld movement capture device 800 is associated with a housing that includes a top portion 802 and a body portion 804. In an exemplary embodiment, the housing may be configured with top portion 802 and body portion 804 as separate portions joined along a boundary 806. Boundary 806 may be configured to allow a rotatable connection between top portion 802 and body portion 804, as shown below. In other embodiments, however, the housing may be integrally formed including top portion 802 and body portion 804 as a unitary component.

Top portion 802 may be associated with one or more components of a portable movement capture device, including any of the components associated with portable movement capture device 102 and/or portable movement capture device 200, described above. In this embodiment, top portion 802 may be configured to hold a camera 808. Camera 808 may be any type of camera, including any type of camera 106, described above. In this embodiment, camera 808 is a high-speed camera that is configured to capture still images and/or video information. In this embodiment, top portion 802 may further include an IR sensor 810. In one embodiment, IR sensor 810 may be configured to determine a distance between handheld movement capture device 800 and a target. IR sensor may also be configured as a launch monitor to capture information associated with various characteristics of the interaction of a golf club head and golf ball upon impact and/or a golf ball's flight, as discussed above in reference to launch monitor 118. In other embodiments, top portion 802 may additional include other sensors, including any sensors described above in reference to portable movement capture device 102. For example, in some embodiments, handheld movement capture device 800 may include a GPS receiver for providing location information and/or time information.

Generally, body portion 804 may be configured with a shape that fits within a hand of a user. In other embodiments, however, body portion 804 may have a different shape. Body portion 804 may be associated with additional components of a portable movement capture device, including any of the components associated with portable movement capture device 102 and/or portable movement capture device 200, described above. In this embodiment, body portion 804 may be configured to hold a lighting element 812. Lighting element 812 may be any type of light source, including any type of light source 108, described above. In an exemplary embodiment, lighting element 812 may be a flash for camera 808. In other embodiments, handheld movement capture device 800 may be associated with additional lighting elements that can be associated with handheld movement capture device 800 in a wired or wireless manner.

In some embodiments, portions of handheld movement capture device 800, including body portion 804 may include provisions for assisting a user to grip or hold handheld movement capture device 800. In this embodiment, body portion 804 includes gripping members 814 disposed along sides of body portion 804. Similar gripping members as gripping members 814 may be disposed on other portions of handheld movement capture device 800, including top portion 802 and/or body portion 804.

Figure 10:
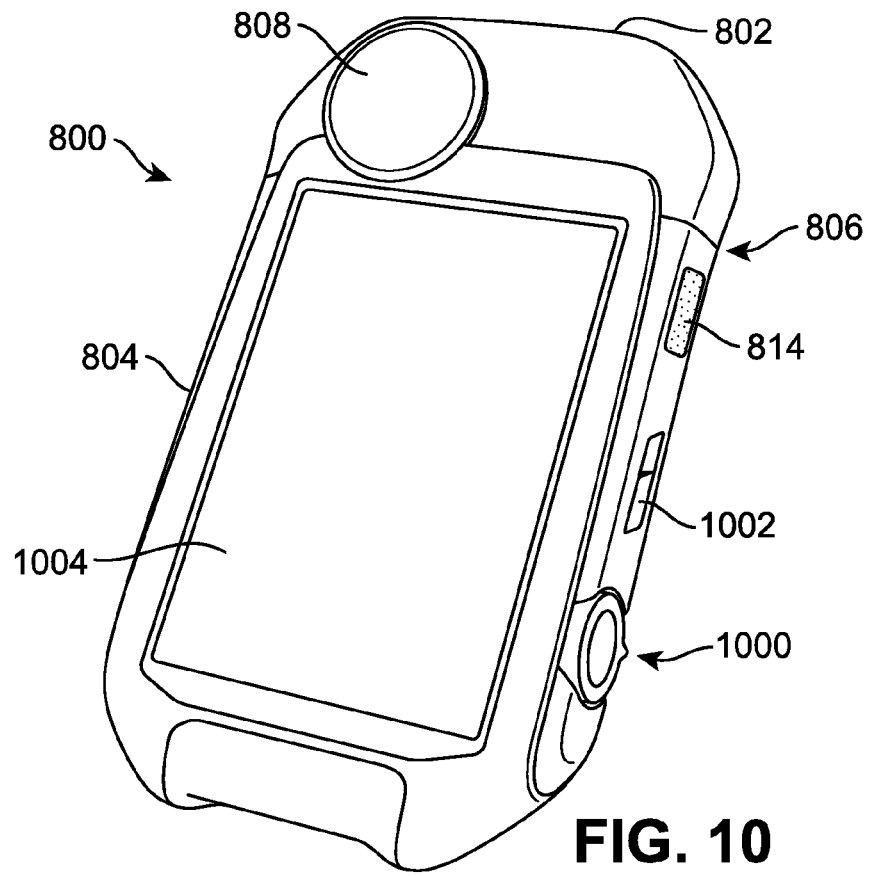
FIG. 10 is an isometric rear view of an alternate embodiment of a portable movement capture device.

Referring now to FIG. 10, a backside of handheld movement capture device 800 is illustrated. As shown in this view, gripping member 814 may be disposed on body portion 804 on a side opposite gripping members 814 shown in FIG. 8. In some embodiments, handheld movement capture device 800 may include provisions typically associated with a camera, including a shutter button 1000 and a power button 1002. In some embodiments, shutter button 1000 may be used to begin capturing information with camera 808. In an exemplary embodiment, shutter button 1000 may be configured to allow manual operation of handheld movement capture device 800 to capture information. In addition, in some embodiments, shutter button 1000 may be used with a timer that delays capturing information using camera 808 for a predetermined amount of time after depression of shutter button 1000. In other embodiments, a microphone or remote control device, as described above, may be used to initiate capturing information with camera 808.

Power button 1002 may be associated with a power source, including any power source described herein. In an exemplary embodiment, handheld movement capture device may include a rechargeable battery. In some embodiments, power button 1002 may be configured to control the power source so as to transition handheld movement capture device 800 between an on state and an off state. In an exemplary embodiment, power button 1002 may be associated with a CPU that controls one or more components within handheld movement capture device 800. With this arrangement, power button 1002 may be used to instruct the CPU to ready handheld movement capture device 800 into an active or on state for capturing information and/or for entering a standby or off state.

In some embodiments, handheld movement capture device 800 may further include a display 1004. Display 1004 may be configured to allow a user to view and/or analyze captured information that has been obtained using handheld movement capture device 800. With this arrangement, by providing handheld movement capture device 800 with display 1004, immediate analysis and playback of captured information may be performed by a user and/or golfer without having to connect to a separate computer. In other embodiments, however, handheld movement capture device 800 may optionally be used with an external display and/or a computer, including computer 104, discussed above, using any type of connection, including connection 120, also discussed above.

Figure 11:
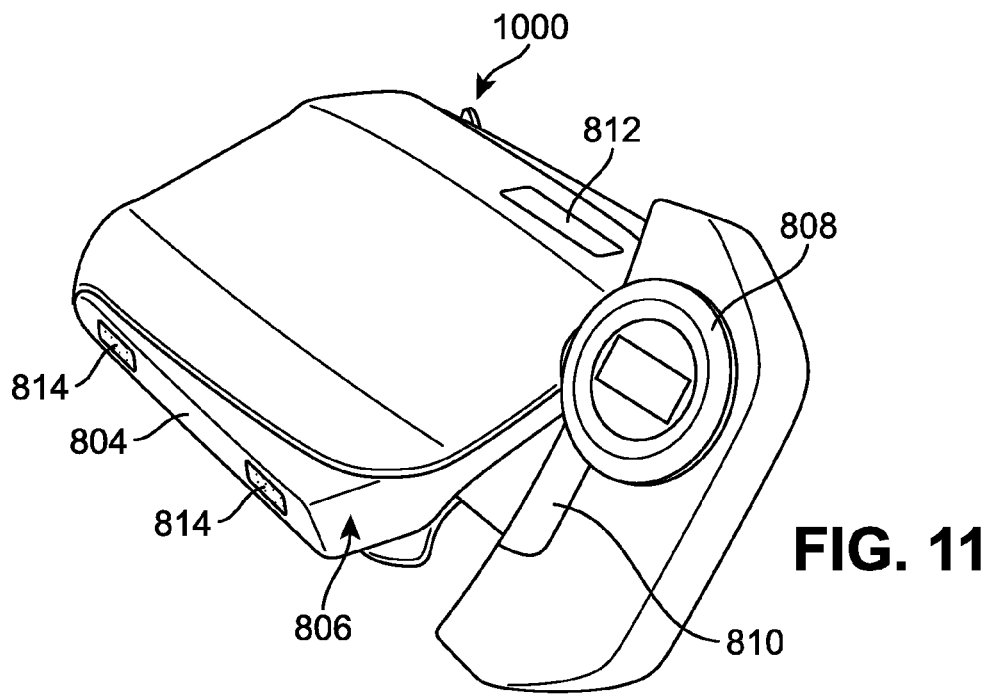
FIG. 11 is an isometric view of an alternate embodiment of a portable movement capture device with a rotating camera.

Referring now to FIG. 11, an isometric view of handheld movement capture device 800 with a rotating camera 808 is illustrated. In some embodiments, boundary 806 may be configured to allow a rotatable connection between top portion 802 and body portion 804. With this arrangement, the line of sight of camera 808 may be adjusted by rotating top portion 802 relative to body portion 804. Such a rotatable connection may allow for a user to capture information that is disposed along different lines of sight. For example, in some embodiments, a user may use handheld movement capture device 800 to capture information associated with a golfer, then rotate top portion 802 to adjust the line of sight of camera 808 to track the flight path of a hit golf ball.

In addition, handheld movement capture device 800 may include one or more additional components, including any components discussed above in reference to portable movement capture device 102 and/or portable movement capture device 200. In some embodiments, handheld movement capture device 800 may include memory for storing captured information obtained with camera 808. In some cases, the memory may be integrated memory. In other cases, the memory may be a removable memory card or other media. In some embodiments, handheld movement capture device 800 may include a connection, including any type of connection described above, including connection 120, to transfer captured information from the memory in handheld movement capture device 800. For example, the captured information may be transferred to a computer for further analysis or may be stored or archived in a database.

Referring now to FIG. 12, a process of capturing a golf swing using handheld movement capture device 800 is illustrated. In this embodiment, handheld movement capture device 800 may be used to capture information associated with the golf swing of a golfer 1200. In some embodiments, handheld movement capture device 800 may be used to capture information associated with any one or more of a golf club 1202, a club head 1204, and/or a golf ball 1206 when struck by golfer 1200 during a golf swing. Such information can include initial velocity, launch direction, spin rates, spin directions, club head speed, club head orientation at ball impact, and other parameters associated with golf club 1202, club head 1204, and/or golf ball 1206.

In an exemplary embodiment, handheld movement capture device 800 may also capture information associated with one or more regions of golfer 1200 during a golf swing, as described above in reference to FIG. 6. In this embodiment, golfer 1200 may be described as having a head region 1210, a shoulder region 1212, an arm region 1214, a hand region 1216, a leg region 1218, and a foot region 1220. Each region may identify one or both sides of golfer 1200. In other words, shoulder region 1212 may be associated with either a right or left shoulder region, or may be associated with both right and left shoulder regions. Similarly, arm region 1214, hand region 1216, leg region 1218, and/or foot region 1220 may be associated with both right and left sides or only a single left or right side of golfer 1200. While certain regions have been identified in this description, it should be understood that other regions may be described or isolated for analysis of a golf swing.

In some embodiments, handheld movement capture device 800 may be held in place to capture information using different mechanisms. In an exemplary embodiment, handheld movement capture device 800 may be set upon a ground surface 1208 using a stand 1222. Stand 1222 may be any type of stand configured to hold handheld movement capture device 800 in a stable position. In an exemplary embodiment, stand 1222 may be a tripod. In other embodiments, stand 1222 may include other devices configured to hold handheld movement capture device 800. In another embodiment, handheld movement capture device 800 may be configured to be held by a hand 1224 of a user. With this arrangement, hand 1224 may direct the line of sight of camera 808 to capture the desired information associated with the golf swing of golfer 1200.

In addition, other holding mechanisms for handheld movement capture device 800 are possible. In another embodiment, handheld movement capture device 800 may be associated with a bracket 1226 mounted on a golf cart 1228. With this arrangement, handheld movement capture device 800 may be used to capture information associated with the golf swing of golfer 1200 without requiring an additional person to hold and/or direct the line of sight of camera 808, as in an embodiment where handheld movement capture device 800 is held by hand 1224 above.

In an exemplary embodiment, once information associated with a golf swing of golfer 1200 is obtained using handheld movement capture device 800, process 700, as described above, may be performed using display 1004 to view and/or analyze the captured information. In an exemplary embodiment, finite element analysis of the captured information from handheld movement capture device 800 may be performed as shown in FIG. 7 and described above.

In some embodiments, a portable movement capture device may be provided with multiple cameras. Multiple cameras may allow information associated with more than one region of interest associated with a player performing a sports activity to be captured simultaneously. Multiple cameras may also allow information associated with the same region of interest associated with a player performing a sports activity to be captured from multiple angles and/or multiple locations. In an exemplary embodiment, FIGS. 13 through 18 illustrate various embodiments of a portable movement capture device with multiple cameras to capture information associated with a golf swing of a golfer.

Figure 13:
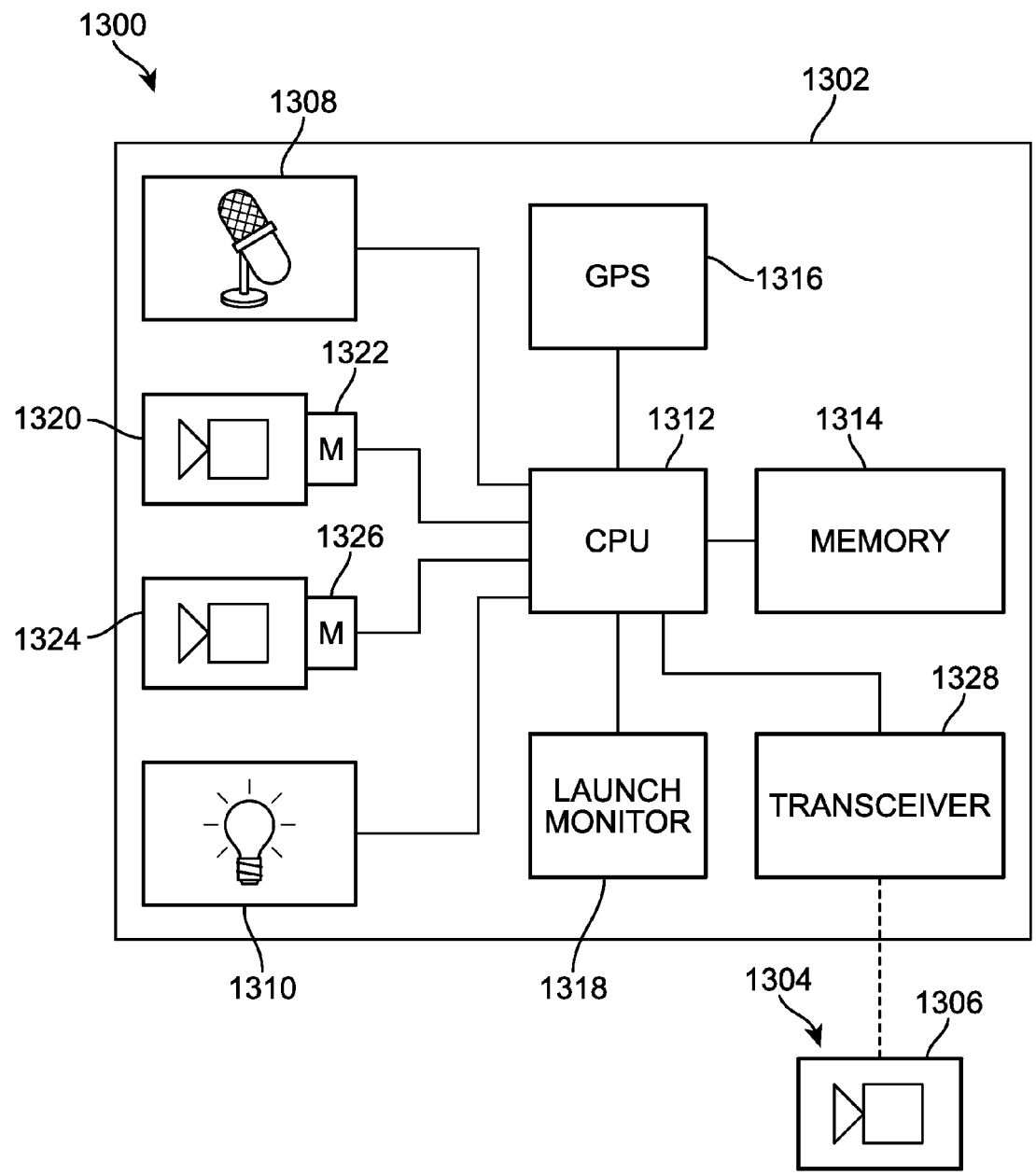
FIG. 13 is a schematic view of an alternate embodiment of a system including a portable movement capture device with multiple cameras.

Referring now to FIG. 13, a schematic view of an alternate embodiment of a system 1300 including a portable movement capture device 1302 with multiple cameras is illustrated. In some embodiments, system 1300 may include one or more components that are substantially similar to system 100, as described above, including computer 104 and/or connection 120. In this embodiment, system 1300 includes portable movement capture device 1302 that includes one or more components that are configured to capture and/or record information associated with a player performing a sports activity. In an exemplary embodiment, portable movement capture device 1302 may include substantially similar components as portable movement capture device 102. Different embodiments of portable movement capture device 1302 may include different components. Any of the following components associated with portable movement capture device 1302 may be considered optional in some embodiments. Some embodiments may include a given component, while others may exclude it. The following description discloses many of the possible components that may be used with portable movement capture device 1302, however, it should be kept in mind that not every component must be used in a given embodiment.

In an exemplary embodiment, portable movement capture device 1302 may include one or more sensors for capturing various information associated with a player performing a sports activity, including any of the sensors described above in reference to portable movement capture device 102. In one embodiment, portable movement capture device 1302 may be configured to capture information associated with a golf swing of a golfer. In this embodiment, portable movement capture device 1302 includes components or sensors that are configured to record information associated with a golf swing. In one embodiment, portable movement capture device 1302 may include a number of components that are substantially similar to the corresponding component described above in reference to portable movement capture device 102.

In this embodiment, portable movement capture device 1302 includes microphone 1308. In some embodiments, microphone 1308 may be substantially similar to microphone 110, described above. In some cases, microphone 1308 may be used to detect a sound associated with a player performing a sports activity. For example, in the case where portable movement capture device 1302 is used to capture a golf swing, microphone 1308 may be used to detect the sound of a golf club hitting a golf ball. As described above, microphone 1308 may be used as a trigger to starting capturing information using one or more cameras. In other cases, microphone 1308 may be used to record audio associated with a player performing a sports activity for analysis. For example, in the case where portable movement capture device 1302 is used to capture a golf swing, microphone 1308 may be used to record the sound of a golf club hitting a golf ball for further analysis, including the T-shaped microphone array, described above.

In some embodiments, portable movement capture device 1302 may include a light source 1310. In some embodiments, light source 1310 may be substantially similar to light source 108, described above. In an exemplary embodiment, light source 1310 may provide lighting for one or more cameras. In one embodiment, light source 1310 may include one or more arrays of LED lighting elements. With this arrangement, cameras associated with portable movement capture device 1302 may be provided with sufficient lighting to capture the movement of a player performing a sports activity.

In some embodiments, portable movement capture device 1302 may include a central processing unit (CPU) 1312. CPU 1312 may be a microprocessor or other computer that is configured to control one or more components of portable movement capture device 1302. In some embodiments, CPU 1312 may be substantially similar to CPU 112, described above. In addition, CPU 1312 may include a number of ports that facilitate the input and output of information and power between the various components of portable movement capture device 1302.

In some embodiments, portable movement capture device 1302 may include a memory 1314. In some embodiments, memory 1314 may be substantially similar to memory 114, described above. In an exemplary embodiment, memory 1314 may be configured to store information obtained from one or more of the components associated with portable movement capture device 1302. In one embodiment, CPU 1312 may communicate with memory 1314. Memory 1314 may include any kind of storage device, including but not limited to: magnetic, optical, magneto-optical, and/or memory, including volatile memory and non-volatile memory. In some embodiments, memory 1314 may be integral with CPU 1312. In other embodiments, memory 1314 may separate from CPU 1312 and communicate with CPU 1312. In addition, in some embodiments, memory 1314 may be used to supplement memory associated with one or more individual components of portable movement capture device 1302. In one embodiment, memory 1314 may be configured to store captured information obtained from one or more cameras and/or microphone 1308. In still other embodiments, memory 1314 may be separate from portable movement capture device 1302 and may communicate with portable movement capture device 1302 through a connection, including any of the connection types discussed above in reference to connection 120.

In some embodiments, portable movement capture device 1302 may include multiple cameras. In this embodiment, portable movement capture device 1302 includes a first camera 1320 and a second camera 1324. First camera 1320 and/or second camera 1324 may be a high-speed camera capable of recording audio and/or visual information. In some cases, first camera 1320 and/or second camera 1324 may record video. In other cases, first camera 1320 and/or second camera 1324 may record multiple still images taken at a rapid rate. In other embodiments, first camera 1320 and/or second camera 1324 may be any type of camera, including any type of camera described in reference to camera 106, described above. In an exemplary embodiment, first camera 1320 and/or second camera 1324 may be high-speed cameras that are configured to take video and/or still images at a rapid rate.

In some embodiments, portable movement capture device 1302 may include provisions for adjusting the viewing angle or line of sight of one or more cameras. In an exemplary embodiment, first camera 1320 and/or second camera 1324 may be associated with one or more movement mechanisms configured to adjust the viewing angle or line of sight of first camera 1320 and/or second camera 1324. In this embodiment, a first movement mechanism 1322 is configured to move first camera 1320 to capture information associated with a desired region of interest. For example, by raising or lowering the angle of first camera 1320, different regions associated with a golf swing of a golfer may be captured by first camera 1320. Likewise, by turning first camera 1320 to the left or right, or up or down, the viewing angle or line of sight of first camera 1320 may be adjusted. Furthermore, in this embodiment, a second movement mechanism 1326 may be configured to move second camera 1324 in a similar manner. With this arrangement, each of first camera 1320 and second camera 1324 may be configured to capture information associated with different regions of interest associated with a golf swing of a golfer and/or to capture information associated with the same region of interest from different viewing angles or lines of sight.

In some embodiments, each of first movement mechanism 1322 and second movement mechanism 1326 may be associated with CPU 1312. In an exemplary embodiment, CPU 1322 may be configured to control first movement mechanism 1322 and/or second movement mechanism 1326 to adjust the viewing angles or lines of sight of first camera 1320 and/or second camera 1324, based on information gathered from various sensors associated with portable movement capture device 1302 and/or based on commands from a user.

In some embodiments, portable movement capture device 1302 may include additional components configured to obtain information associated with a player performing a sports activity, including additional components as described above in reference to portable movement capture device 102. In an exemplary embodiment, portable movement capture device 1302 may include a GPS receiver 1316 for receiving GPS information. In some embodiments, GPS receiver 1316 may be substantially similar to GPS receiver 116, described above. Additionally, in this embodiment, portable movement capture device 1302 may further include a conventional golf ball launch monitor 1318. In some embodiment, golf ball launch monitor 1318 may be substantially similar to golf ball launch monitor 118, described above.

In some embodiments, all or most of the components shown in FIG. 13 associated with portable movement capture device 1302 may be housed in a single case or unit. In other embodiments, the various components shown in FIG. 13 are not housed in a single physical case, but instead, are distributed as one or more separate components and may communicate with one another via known wired or wireless methods. In an exemplary embodiment, a first group of components may be housed in a single case or unit associated with portable movement capture device 1302 and one or more additional components may be associated with system 1300 as separate components.

In an exemplary embodiment, system 1300 may optionally include one or more separate components from portable movement capture device 1302 that are provided as a distributed unit 1304. In this embodiment, distributed unit 1304 may be physically separated from portable movement capture device 1302. In some embodiments, distributed unit 1304 may be in communication with portable movement capture device 1302 via a wired or wireless connection, including any type of connection as described above in reference to connection 120. With this configuration, distributed unit 1304 may receive information and commands from CPU 1312 and may also send captured information and other information to portable movement capture device 1302. In an exemplary embodiment, portable movement capture device 1302 may include a transceiver 1328 that is configured to send and/or receive signals to and/or from distributed unit 1304. Similarly, distributed unit 1304 may include a substantially similar provision to send and/or receive signals to and/or from portable movement capture device 1302.

In an exemplary embodiment, distributed unit 1304 may include a third camera 1306. Camera 1306 may be a high-speed camera capable of recording audio and/or visual information. In some cases, camera 1306 may record video. In other cases, camera 1306 may record multiple still images taken at a rapid rate. In an exemplary embodiment, camera 1306 may be substantially similar to camera 106, described above. In addition, in some embodiments, camera 1306 may be provided with a movement mechanism, as described above in reference to first camera 1320 and second camera 1324. In other embodiments, third camera 1306 may include a base or stand to align the viewing angle or line of sight. In an exemplary embodiment, camera 1306 may be configured to capture information associated with different regions of interest associated with a golf swing of a golfer and/or to capture information associated with the same region of interest from different viewing angles or lines of sight as each or both of first camera 1320 and/or second camera 1324.

In the exemplary embodiment described herein, distributed unit 1304 includes camera 1306. In other embodiments, however, distributed unit 1304 may include different or additional components. For example, in one embodiment, distributed unit 1304 may include light source 1310 or an additional light source to provide lighting for one or more cameras associated with portable movement capture device 1302. In still other embodiments, distributed unit 1304 may include microphone 1308 or an additional microphone to detect or capture information associated with a golf swing of a golfer. It should also be understood that distributed unit 1304 may be configured to include any one or more components associated with portable movement capture device 1302 as separate components that are physically separate from portable movement capture device 1302.

Figure 14:
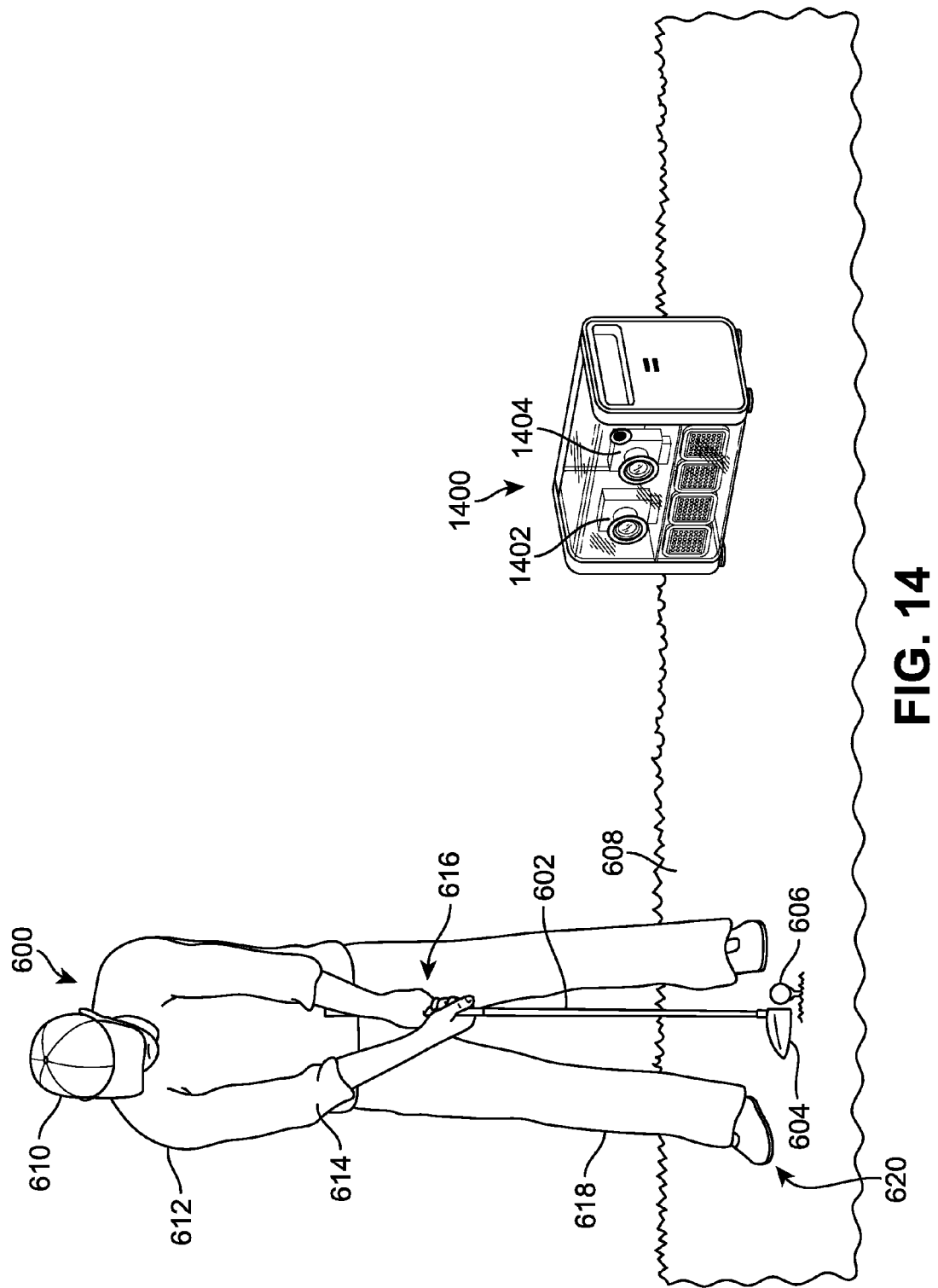
FIG. 14 is a schematic view of an exemplary process of capturing a golf swing using a portable movement capture device with multiple cameras.
Figure 15:
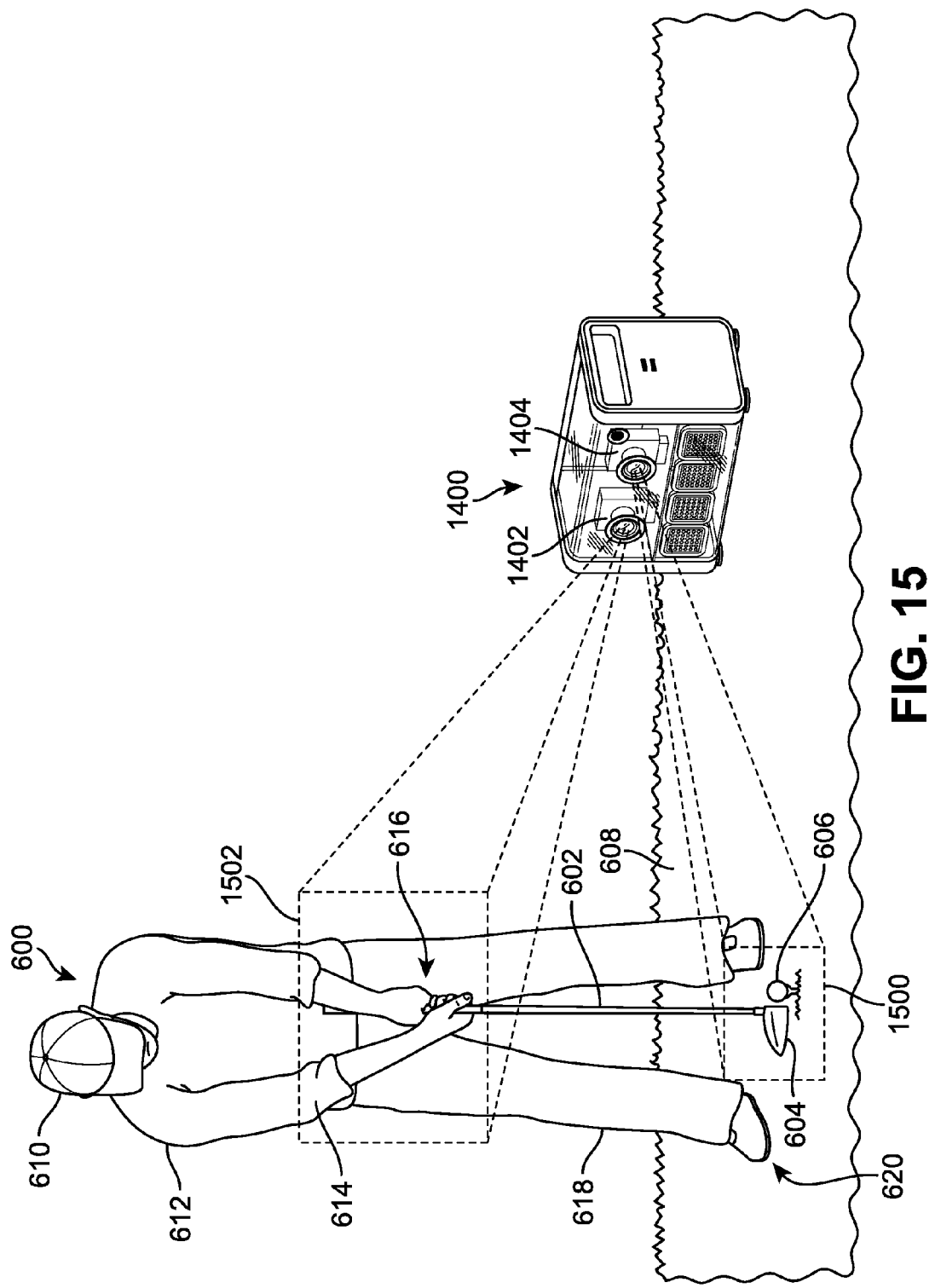
FIG. 15 is a schematic view of an exemplary process of capturing multiple regions associated with a golf swing using a portable movement capture device with multiple cameras.

FIGS. 14 and 15 illustrate a process of capturing a golf swing using a portable movement capture device 1400 that includes multiple cameras for analyzing the captured information using finite element analysis. In some embodiments, portable movement capture device 1400 may include one or more components disposed within the interior of a housing in a similar manner as described above in reference to housing 202 associated with portable movement capture device 200. In some embodiments the housing may be substantially similar to housing 202, described above. In different embodiments, the components disposed within the housing may be any combination of components discussed above in reference to portable movement capture device 1302. The embodiments illustrated in FIGS. 14 and 15 include one possible combination of components that may be disposed within a housing of portable movement capture device 1400, however, it should be understood that additional or different components may be included in different embodiments.

In an exemplary embodiment, portable movement capture device 1400 may be configured with multiple cameras for capturing information associated with a golf swing of a golfer. In this embodiment, portable movement capture device 1400 includes a first camera 1402 and a second camera 1404. In some embodiments, first camera 1402 and second camera 1404 may be substantially similar to first camera 1320 and/or second camera 1324, described above, including associated movement mechanisms. Additionally, in some embodiments, portable movement capture device 1400 may otherwise be substantially similar to portable movement capture device 200, described above.

As shown in FIG. 14, portable movement capture device 1400 may be used to capture information associated with the golf swing of golfer 600. In some embodiments, portable movement capture device 1400 may be used in a substantially similar manner as portable movement capture device 200, described above, to capture information associated with a golf swing of golfer 600. In some embodiments, portable movement capture device 1400 may be used to capture information associated with any one or more of golf club 602, club head 604, and/or golf ball 606 when struck by golfer 600 during a golf swing, as described above in reference to FIG. 6. Such information can include initial velocity, launch direction, spin rates, spin directions, club head speed, club head orientation at ball impact, and other parameters associated with golf club 602, club head 604, and/or golf ball 606.

In an exemplary embodiment, portable movement capture device 1400 may also capture information associated with one or more regions of golfer 600 during a golf swing. In this embodiment, golfer 600 may be described as having head region 610, shoulder region 612, arm region 614, hand region 616, leg region 618, and foot region 620, as described above. Each region may identify one or both sides of golfer 600. In other words, shoulder region 612 may be associated with either a right or left shoulder region, or may be associated with both right and left shoulder regions. Similarly, arm region 614, hand region 616, leg region 618, and/or foot region 620 may be associated with both right and left sides or only a single left or right side of golfer 600. While certain regions have been identified in this description, it should be understood that other regions may be described or isolated for analysis of a golf swing.

In an exemplary embodiment, portable movement capture device 1400 may be set upon ground surface 608. One or more ground-engaging members on portable movement capture device 1400, as discussed above with reference to portable movement capture device 200, may be adjusted up or down in height to adjust the height of portable movement capture device 1400.

In some embodiments, each of first camera 1402 and second camera 1404 may be individually positioned to adjust the viewing angle or line of sight of each camera. For example, a movement mechanism, as described above and as described in more detail in reference to FIG. 16 below, may be used with each of first camera 1402 and second camera 1404. With this arrangement, portable movement capture device 200 may be configured to capture information associated with one or more regions associated with golfer 600.

Referring now to FIG. 15, the viewing angle or line of sight of first camera 1402 and second camera 1404 may be configured to capture information associated with one or more regions associated with golfer 600. In an exemplary embodiment, portable movement capture device 1400 may be arranged on ground surface 608 and each of the multiple cameras may be adjusted so that any one or more regions associated with golfer 600, including head region 610, shoulder region 612, arm region 614, hand region 616, leg region 618, and foot region 620, as well as golf club 602, club head 604 and/or golf ball 606, are within the line of sight of one or more camera disposed in portable movement capture device 1400.

In one embodiment, first camera 1402 may be configured with a line of sight corresponding to a first viewing area 1502 that includes at least one region of interest associated with a golf swing of golfer 600. In this embodiment, first viewing area 1502 includes at least a portion of arm region 614 and/or hand region 616. Similarly, second camera 1404 may be configured with a line of sight corresponding to a second viewing area 1500 that includes at least one region of interest associated with a golf swing of golfer 600. In this embodiment, second viewing area 1500 includes at least a portion of golf club 602, club head 604 and/or golf ball 606, as well as a portion of foot region 620. In other embodiments, first viewing area 1502 and second viewing area 1500 may include more or less regions associated with a golfer. In this embodiment, first viewing area 1502 and second viewing area 1500 correspond to different regions of interest associated with a golf swing of golfer 600. In other embodiments, however, first viewing area 1502 and second viewing area 1500 may be configured to correspond to substantially the same region or regions of interest associated with the golf swing of golfer 600.

Figure 16:
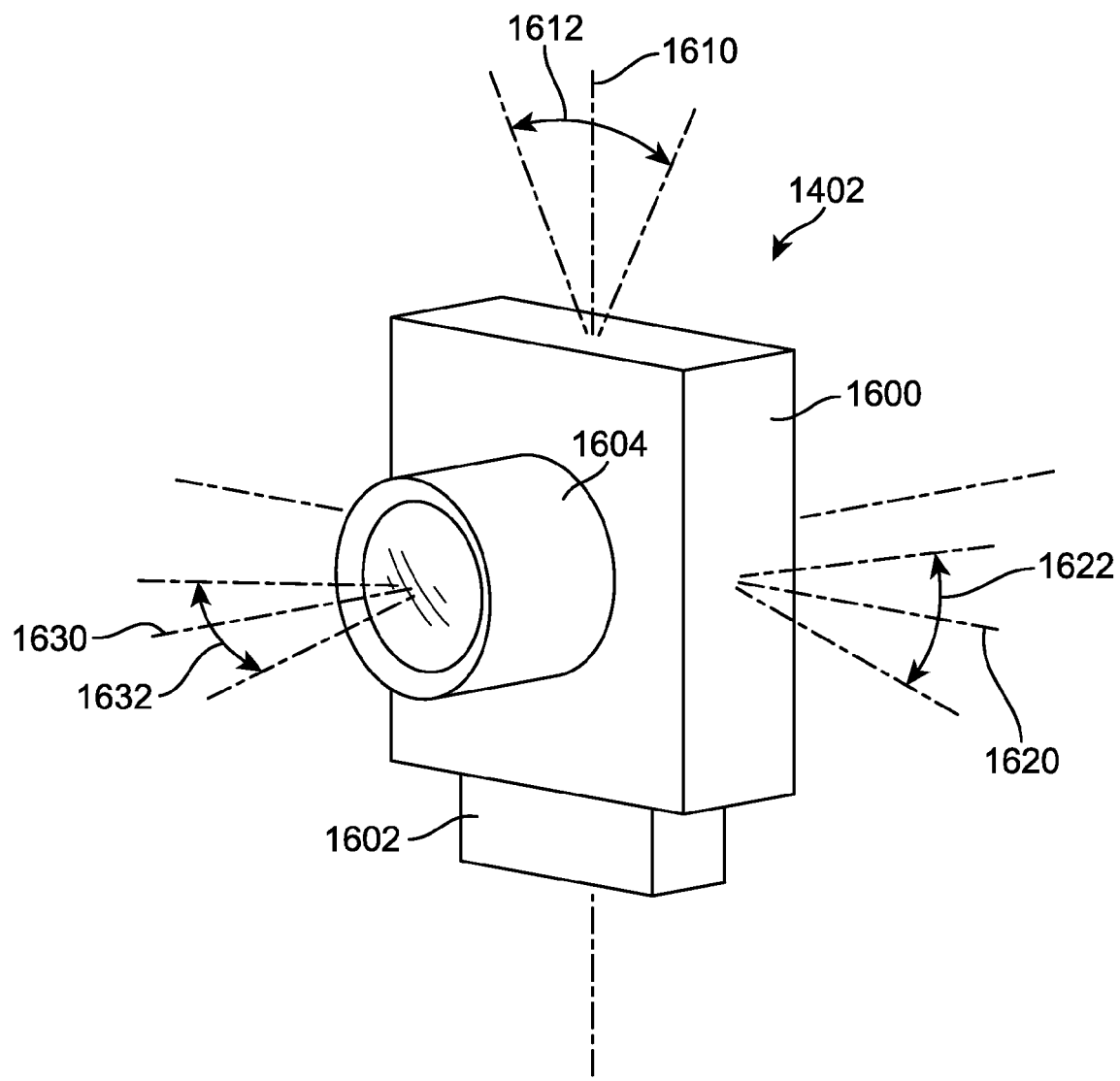
FIG. 16 is an isometric view of an exemplary embodiment of a camera and an associated movement mechanism for a portable movement capture device.

Referring now to FIG. 16, an exemplary embodiment of a movement mechanism associated with first camera 1402 of portable movement capture device 1400 is illustrated. In an exemplary embodiment, first camera 1402 may be provided with a movement mechanism 1602 that is configured to adjust the viewing angle or line of sight of first camera 1402 to capture information associated with a region or regions of interest of a golf swing of a golfer. In this embodiment, movement mechanism 1602 may be attached to a body 1600 of first camera 1402. Movement mechanism 1602 may be any type of device that is configured to move in one or more directions, including via manual operation or automatically using electronic operation. In an exemplary embodiment, movement mechanism 1602 may include an electric servo motor of any type known in the art.

In some embodiments, movement mechanism 1602 may be configured to move body 1600 of first camera 1402 so as to adjust the viewing angle or line of sight of a lens 1604 of first camera 1402. In this embodiment, movement mechanism 1602 is configured to move first camera 1402 about a range of motion associated with three axes. As shown in FIG. 16, movement mechanism 1602 may move body 1600 in a direction associated with a first axis 1610 about a first range of motion 1612. Movement mechanism 1602 may also move body 1600 in a direction associated with a second axis 1620 about a second range of motion 1622 and/or a third axis 1630 about a third range of motion 1632. In addition, movement mechanism 1602 may be further configured to move body 1600 of first camera 1402 up or down along first axis 1610 and/or left or right along second axis 1620. In addition, while in the current embodiment, movement mechanism 1602 is configured to move body 1600 about three dimensions, in other embodiments, movement mechanism 1602 may be configured to move body 600 about only two dimensions, or along a single dimension. Similarly, second camera 1404 may include a substantially similar movement mechanism that is configured to adjust the viewing angle or line of sight of a lens of second camera 1404. With this configuration, first camera 1402 and/or second camera 1404 may be configured to capture information associated with one or more regions associated with golfer 600.

Figure 17:
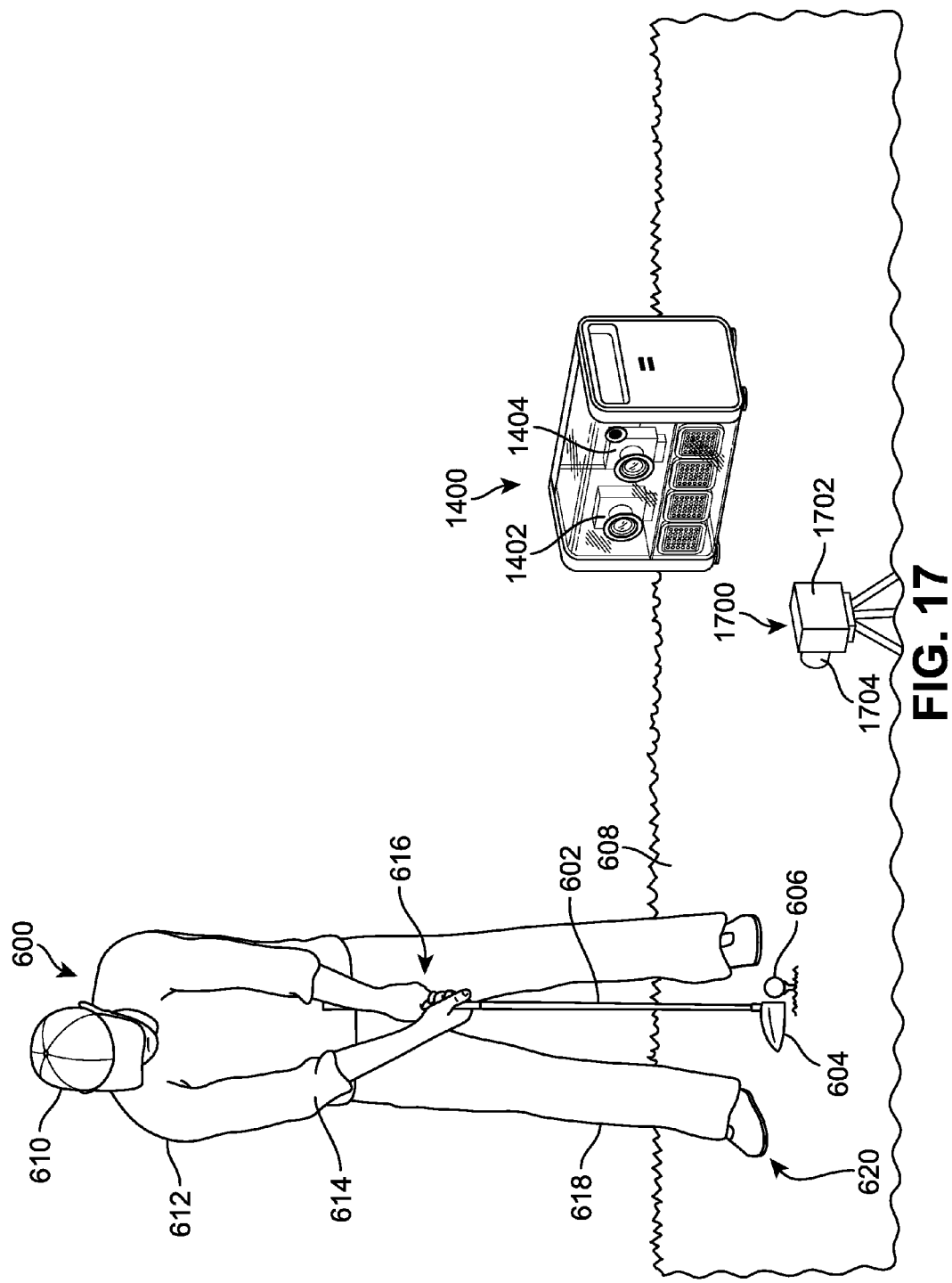
FIG. 17 is a schematic view of an alternate process of capturing a golf swing using a portable movement capture device with multiple cameras.

In some embodiments, portable movement capture device 1400 may be used with one or more additional components configured as distributed units, as described above. Referring now to FIG. 17, an exemplary embodiment of a distributed unit 1700 configured to be used with portable movement capture device 1400 to capture information associated with a golf swing of golfer 600 is illustrated. In an exemplary embodiment, distributed unit 1700 may include a housing 1702 that includes one or more components, as described above in reference to distributed unit 1304. In this embodiment, distributed unit 1700 includes a third camera 1704. In some embodiments, third camera 1704 may be substantially similar to third camera 1306, described above. In an exemplary embodiment, distributed unit 1700 may be in wireless communication with portable movement capture device 1400, as described above.

In other embodiments, distributed unit 1700 may include handheld movement capture device 800 with rotating camera 808, as described above.

Figure 18:
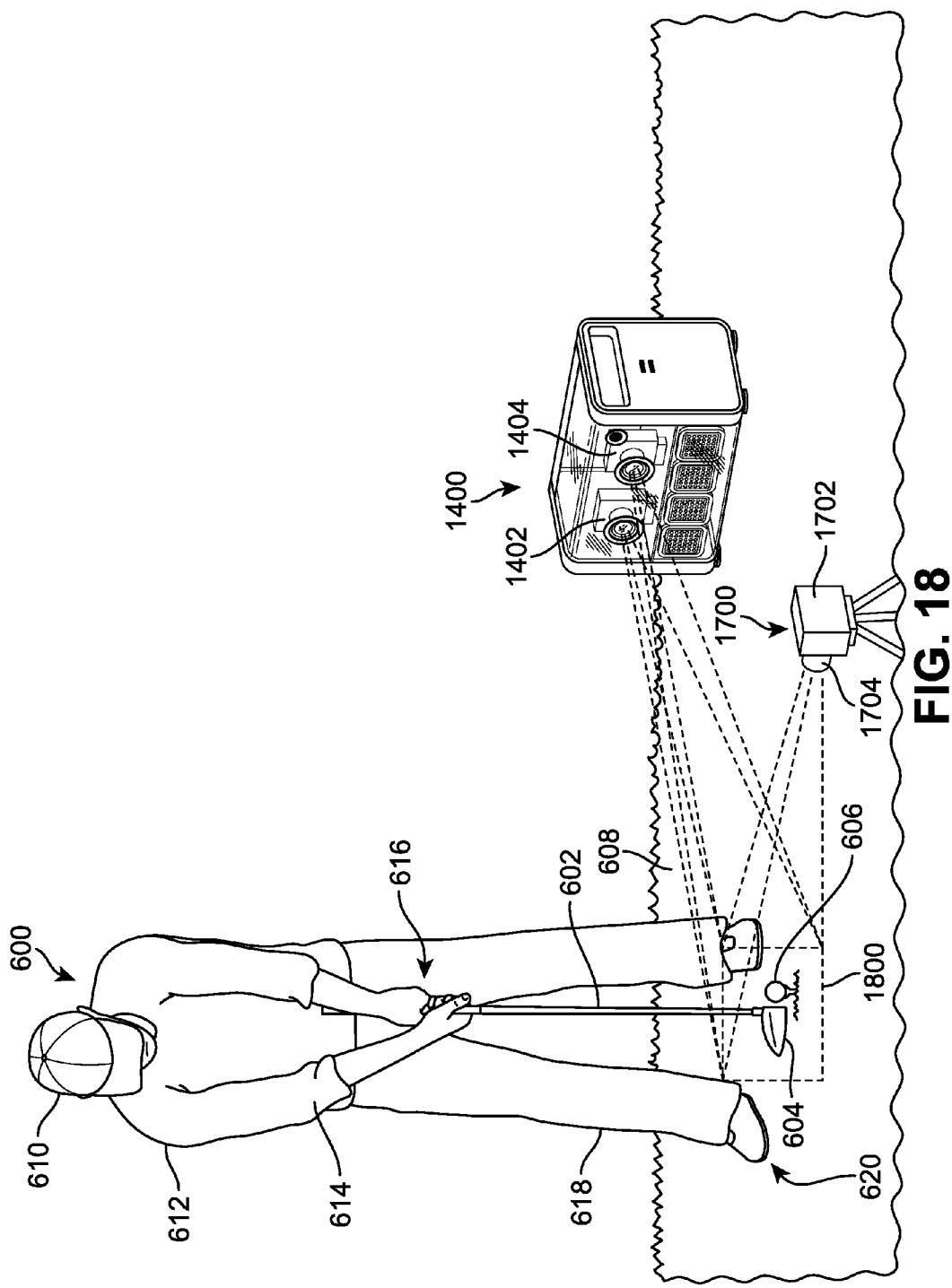
FIG. 18 is a schematic view of an exemplary process of capturing a region associated with a golf swing using a portable movement capture device with multiple cameras.

Referring now to FIG. 18, the viewing angles or lines of sight of multiple cameras may be configured to capture information associated with the same or substantially similar regions associated with a golf swing of golfer 600. In an exemplary embodiment, first camera 1402 and second camera 1404 associated with portable movement capture device 1400, and third camera 1704 associated with distributed unit 1700 may be configured to capture information associated with one or more regions associated with golfer 600. In an exemplary embodiment, portable movement capture device 1400 and distributed unit 1700 may be arranged on ground surface 608 and each of the multiple cameras may be adjusted so that any one or more regions associated with golfer 600, including head region 610, shoulder region 612, arm region 614, hand region 616, leg region 618, and foot region 620, as well as golf club 602, club head 604 and/or golf ball 606, are within the line of sight of one or more cameras.

In one embodiment, each camera of the multiple cameras is configured to capture information associated with the same region of interest from different viewing angles or lines of sight. In this embodiment, first camera 1402 may be configured with a line of sight corresponding to a first viewing area 1800 that includes at least one region of interest associated with a golf swing of golfer 600. In this embodiment, first viewing area 1800 includes at least a portion of golf club 602, club head 604 and/or golf ball 606, as well as a portion of foot region 620. Similarly, second camera 1404 may be configured with a line of sight corresponding to first viewing area 1800. In embodiments that include distributed unit 1700, third camera 1704 may also be configured with a line of sight corresponding to first viewing area 1800. With this arrangement, using multiple viewing angles or lines of sight to capture information associated with the same or substantially similar region of interest associated with a golf swing of a golfer allows finite element analysis according to FIG. 7 of the same region or regions from multiple angles and/or views.

In addition, in some embodiments, the locations of each camera and the relative separation between each camera may also be obtained using manual or automatic methods. For example, in embodiments including a GPS receiver, the locations of each camera and the distance between each camera may be automatically retrieved and recorded. In other embodiments, the distances between each camera may be manually measured by a user. With this arrangement, the captured information obtained from three or more cameras associated with the same or substantially similar regions of interest associated with a golf swing of golfer 600 may be used together with the location information to generate three-dimensional information for the captured region of interest.

In addition, in other embodiments, distributed unit 1700 including third camera 1704 may be configured to capture information associated with one or more different regions associated with a golfer, as described in reference to FIG. 15.

With this arrangement, one or more distributed units may be configured to capture information with multiple different regions of interest associated with a golf swing of a golfer.

In the above described embodiments, once portable movement capture device 1400 and/or distributed unit 1700 is placed on ground surface 608 in position near golfer 600 with the desired line of sights for first camera 1402, second camera 1404, and/or third camera 1704 to capture information associated with the region or regions of interest, portable movement capture device 1400, distributed unit 1700 and/or the associated multiple cameras may be readied for capturing information, as described above in reference to portable movement capture device 200. The captured information from first camera 1402, second camera 1404, and/or third camera 1704 may then be analyzed using the process for finite element analysis described above in reference to FIG. 7.

Different embodiments of portable movement capture devices and associated methods of finite element analysis of captured information have been described herein for analyzing a golf swing of a golfer. In addition, such portable movement capture devices may also be used to gather swing data for ball fitting and/or club fitting purposes. Ball fitting systems are discussed in U.S. Pat. No. 8,758,169, filed on Jul. 7, 2009, and entitled "Method and System for Ball Fitting Analysis," the disclosure of which is hereby incorporated by reference in its entirety. Club fitting systems are discussed in U.S. Pat. Pub. No. 2009/0326688, filed on Jan. 29, 2009, and entitled "Systems and Methods for Fitting Golfers with Golf Clubs," the disclosure of which is hereby incorporated by reference in its entirety. Club fitting may include fitting any golf club to a golfer, including, but not limited to putter matching, driver matching, and matching or fitting one or more irons to a golfer.

While the embodiments of portable movement capture devices described herein have been described with reference to capturing information associated with a golf swing of a golfer, the principles described herein may also be applied to any movement associated with a player performing any sports activity. Similarly, the process of finite element analysis of the captured information may be applied to analyzing information associated with any sports activity. For example, a portable movement capture device may be used to capture information and analyze movements associated with various sports activities, including, but not limited to: pitching, throwing, serving, hitting, kicking, catching, running, diving, swimming, and other sports activities associated with any sport and/or training activities. With this arrangement, isolated and relative movements of various regions of a player may be analyzed in order to study the complex interactions between various movements associated with the respective sports or training activity.

For example, in some sports and/or activities where a noise may be associated with a movement that is to be captured, a portable movement capture device may include a microphone as described above to detect a trigger signal associated with that sport and/or activity. For example, when using a portable movement capture device to capture information associated with a baseball player hitting a baseball or a tennis player hitting a tennis ball, a sound detected by a microphone may be used a trigger to capture information using a camera, as described above.

In addition, in different embodiments, one or more of the components associated with the portable movement capture device may be modified to accommodate capturing information associated with a particular sport and/or activity. For example, a portable movement capture device may be configured to capture and analyze information associated with a baseball pitcher throwing a ball. Finite element analysis may be used on the captured information to isolate regions of the baseball player's body and arm before, during, and after releasing the ball. A similar configuration may be used to capture and analyze information associated with a football player throwing or kicking a ball.

In still other embodiments, a housing associated with a portable movement capture device may be modified to accommodate capturing information associated with a particular sport and/or activity. For example, a portable movement capture device may be made with a waterproof housing to accommodate use of the portable movement capture device to capture and analyze information associated with swimming and/or diving. With this arrangement, finite element analysis may be used on the captured information to isolate regions of the swimmer or diver's body, including hands, arms, and feet as the swimmer or diver is moving into and through the water.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of analyzing captured information associated with a golf swing of a golfer using finite element analysis, the method comprising: capturing information associated with the golf swing of a golfer and one or more regions of the golfer during the golf swing using a camera disposed in a portable movement capture device; storing at least a portion of the captured information in a memory of the portable movement capture device; identifying at least one subset of the captured information in the memory for further analysis; isolating at least one region from the one or more regions of the golfer during the golf swing in the memory; and displaying captured information associated with at least one isolated region from the one or more regions of the golfer apart from the other captured information in the memory, wherein the step of capturing information associated with the golf swing of a golfer further comprises using a plurality of cameras to capture information associated with one or more regions of the golfer during the golf swing, wherein the plurality of cameras are disposed within the portable movement capture device, and further comprising: using a first camera configured to capture information associated with a first region of interest selected from one or more regions of the golfer during the golf swing; and using a second camera configured to capture information associated with a second region of interest selected from one or more regions of the golfer during the golf swing.

2. The method of analyzing captured information according to claim 1, wherein the plurality of cameras comprises at least three cameras.

3. The method of analyzing captured information according to claim 1, wherein the regions of the golfer including at least one of a head region, a shoulder region, an arm region, a hand region, a leg region, and a foot region.

4. The method of analyzing captured information according to claim 1, wherein the first region is different from the second region.

5. The method of analyzing captured information according to claim 1, wherein the first region is the same as the second region.

6. The method of analyzing captured information according to claim 1, wherein the first region and the second region include at least one region in common.

7. The method of analyzing captured information according to claim 1, further comprising using a third camera configured to capture information associated with a third region of interest selected from one or more regions of the golfer during the golf swing.

8. The method of analyzing captured information according to claim 7, wherein the first region, the second region, and the third region are different regions.

9. The method of analyzing captured information according to claim 7, wherein the first region, the second region, and the third region are the same region.

\* \* \* \* \*